(12) United States Patent
Jewell et al.

(10) Patent No.: US 8,579,545 B2
(45) Date of Patent: Nov. 12, 2013

(54) APPARATUS AND METHODS FOR AN OCEAN BOTTOM SEISMIC SENSOR DEPLOYMENT VEHICLE

(75) Inventors: Stephen W. Jewell, Alvin, TX (US); Etienne Marc, Houston, TX (US); James N. Thompson, Sugar Land, TX (US); Reagan N. Woodard, Jr., Sugar Land, TX (US)

(73) Assignee: Fairfield Industries Incorporated, Sugar Land, TX (US)

(*) Notice: Subject to any disclaimer, the term of this patent is extended or adjusted under 35 U.S.C. 154(b) by 115 days.

(21) Appl. No.: 13/038,296

(22) Filed: Mar. 1, 2011

(65) Prior Publication Data

US 2011/0217123 A1 Sep. 8, 2011

Related U.S. Application Data

(60) Provisional application No. 61/309,771, filed on Mar. 2, 2010.

(51) Int. Cl.
*B63C 11/52* (2006.01)

(52) U.S. Cl.
USPC .......................................................... 405/158

(58) Field of Classification Search
USPC .................. 405/158; 187/250, 267, 268, 271; 414/331.12; 221/119, 217, 218, 219
See application file for complete search history.

(56) References Cited

U.S. PATENT DOCUMENTS

| 258,011 | A | * | 5/1882 | Bond ............................. 187/271 |
| 4,170,348 | A | * | 10/1979 | Hoeink et al. ................ 271/240 |
| 4,641,287 | A | | 2/1987 | Neeley |
| 4,715,018 | A | | 12/1987 | Blair |
| 5,497,356 | A | | 3/1996 | Norton, Jr. et al. |
| 5,696,733 | A | | 12/1997 | Zinn et al. |
| 5,757,722 | A | | 5/1998 | Zinn |
| 6,005,828 | A | | 12/1999 | Carroll et al. |
| 6,009,042 | A | | 12/1999 | Workman et al. |
| 6,024,344 | A | | 2/2000 | Buckley et al. |
| 6,285,956 | B1 | | 9/2001 | Bennett et al. |
| 6,350,085 | B1 | | 2/2002 | Bath et al. |
| 6,474,254 | B1 | | 11/2002 | Ambs et al. |
| 6,588,980 | B2 | | 7/2003 | Worman et al. |
| 6,625,083 | B2 | | 9/2003 | Vandenbroucke |
| 6,951,138 | B1 | | 10/2005 | Jones |
| 6,975,560 | B2 | | 12/2005 | Berg et al. |
| 7,016,260 | B2 | | 3/2006 | Bary |
| 7,104,728 | B2 | | 9/2006 | Luc et al. |
| 7,230,878 | B2 | | 6/2007 | Howlid et al. |
| 7,417,924 | B2 | | 8/2008 | Vigen et al. |

(Continued)

FOREIGN PATENT DOCUMENTS

GB 2470784 A * 12/2010
WO WO 2009026002 A1 * 2/2009

*Primary Examiner* — Frederick L Lagman
*Assistant Examiner* — Kyle Armstrong
(74) *Attorney, Agent, or Firm* — Patterson & Sheridan, L.L.P.

(57) ABSTRACT

Embodiments described herein relate to an apparatus and method for transferring one or more seismic sensor devices to or from a support vessel on or near a surface of a body of water and a subsurface marine location. In one embodiment, an apparatus for transferring seismic sensor devices is provided. The apparatus includes a frame structure having one or more rails disposed thereon, the one or more rails comprising an elevator mechanism and defining at least one exit path for one or more seismic sensor devices, and one or more motors coupled to the elevator mechanism.

2 Claims, 24 Drawing Sheets

(56) References Cited

U.S. PATENT DOCUMENTS

| | | |
|---|---|---|
| 2002/0172562 A1 | 11/2002 | Worman et al. |
| 2005/0169713 A1 | 8/2005 | Luc et al. |
| 2006/0120216 A1 | 6/2006 | Ray et al. |
| 2006/0159524 A1* | 7/2006 | Thompson et al. ........... 405/190 |
| 2007/0070808 A1 | 3/2007 | Ray et al. |
| 2007/0248417 A1* | 10/2007 | Berg ............................. 405/158 |
| 2008/0052951 A1 | 3/2008 | Beaulac |
| 2008/0056066 A1 | 3/2008 | George et al. |
| 2008/0106977 A1 | 5/2008 | Ray et al. |
| 2008/0137485 A1 | 6/2008 | Ray et al. |
| 2008/0253225 A1 | 10/2008 | Welker et al. |
| 2008/0271954 A1* | 11/2008 | Fischer ........................ 187/281 |
| 2008/0279045 A1 | 11/2008 | Vigen et al. |
| 2008/0279636 A1 | 11/2008 | Ray et al. |
| 2009/0016157 A1 | 1/2009 | Ray et al. |

\* cited by examiner

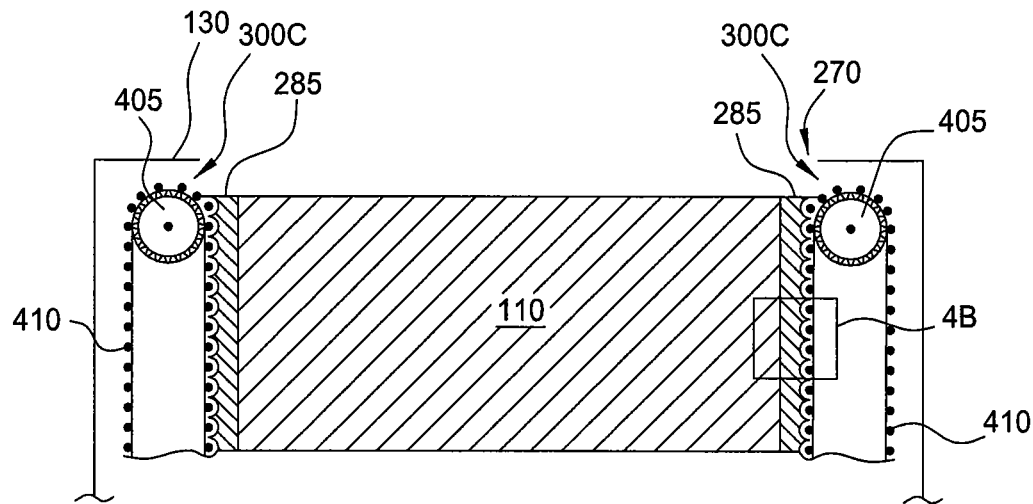
FIG. 4A
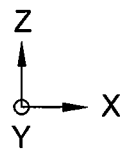
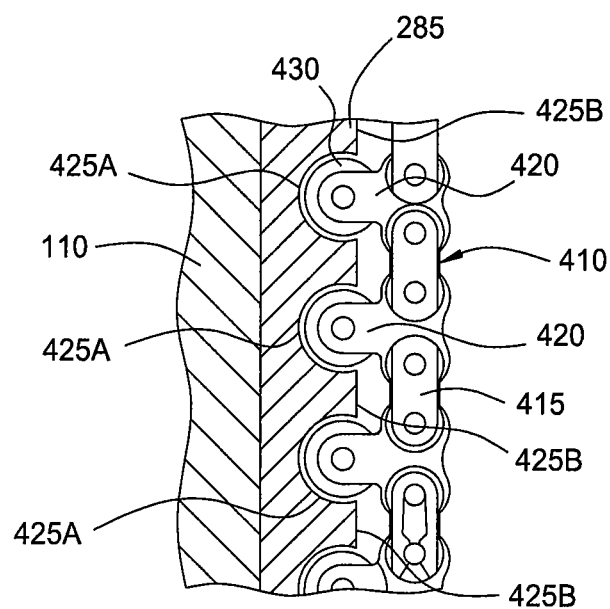
FIG. 4B

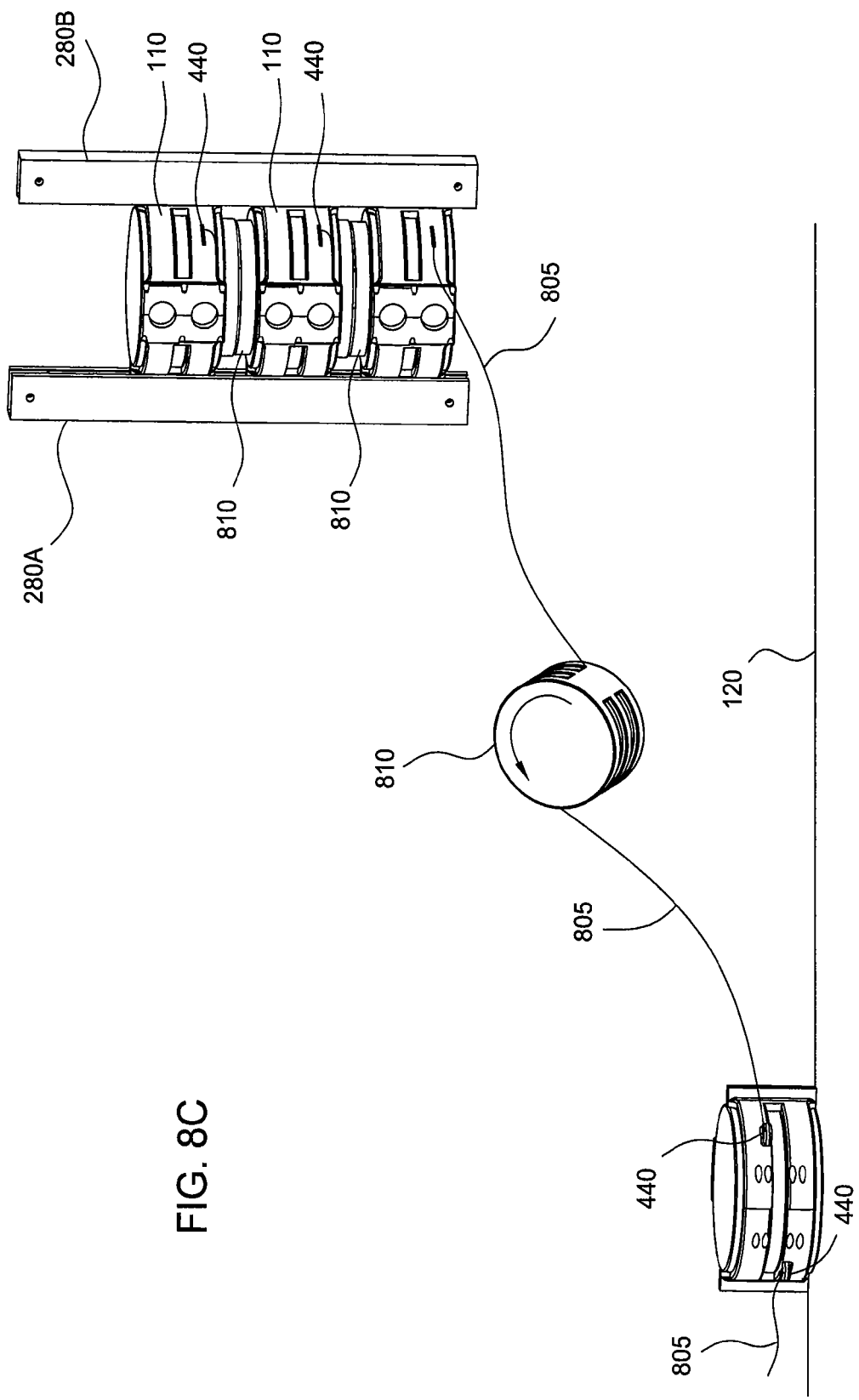

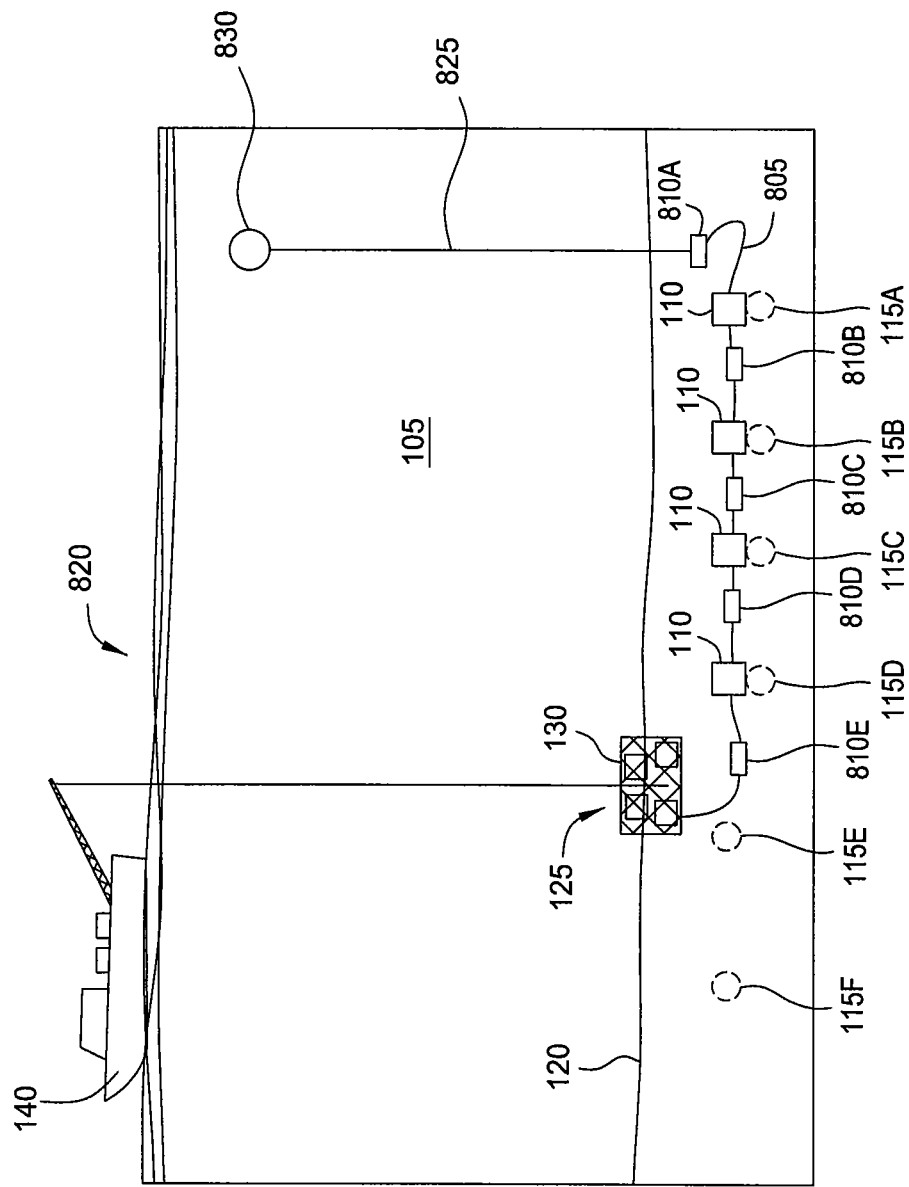

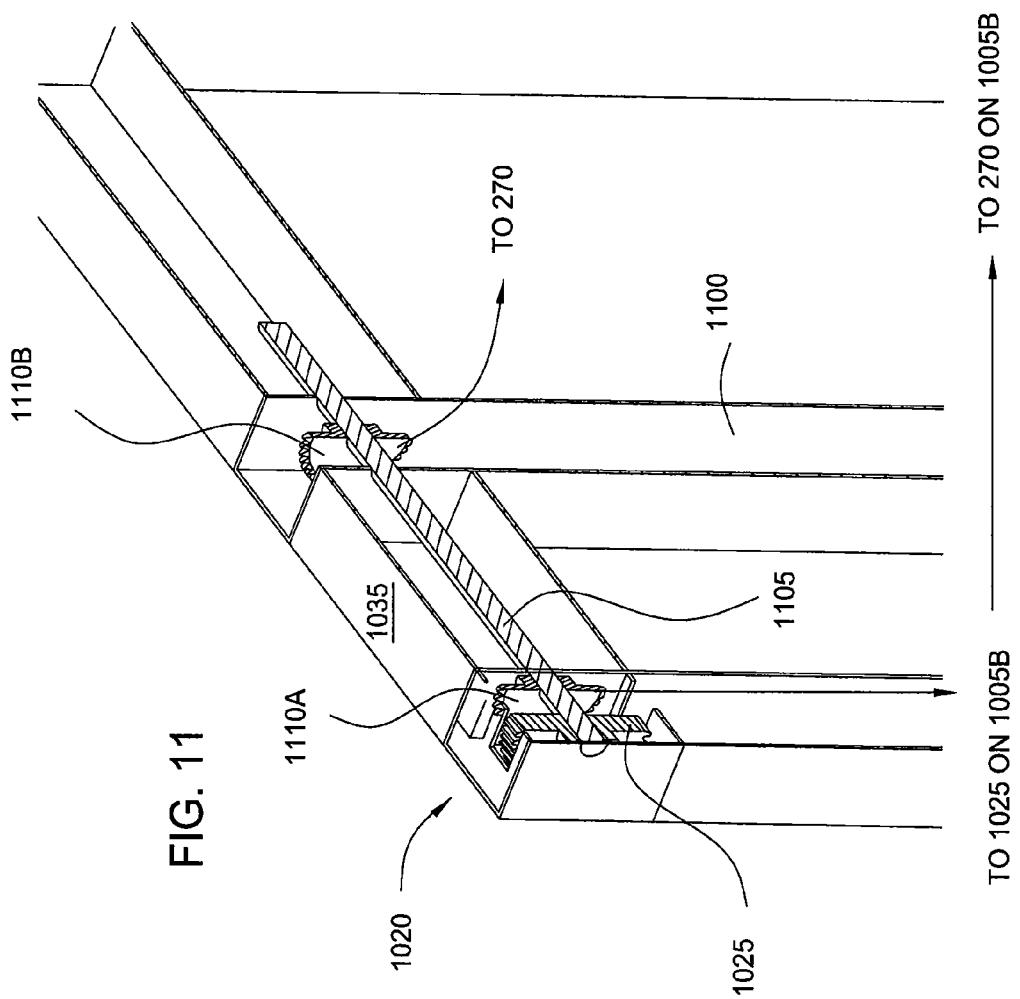

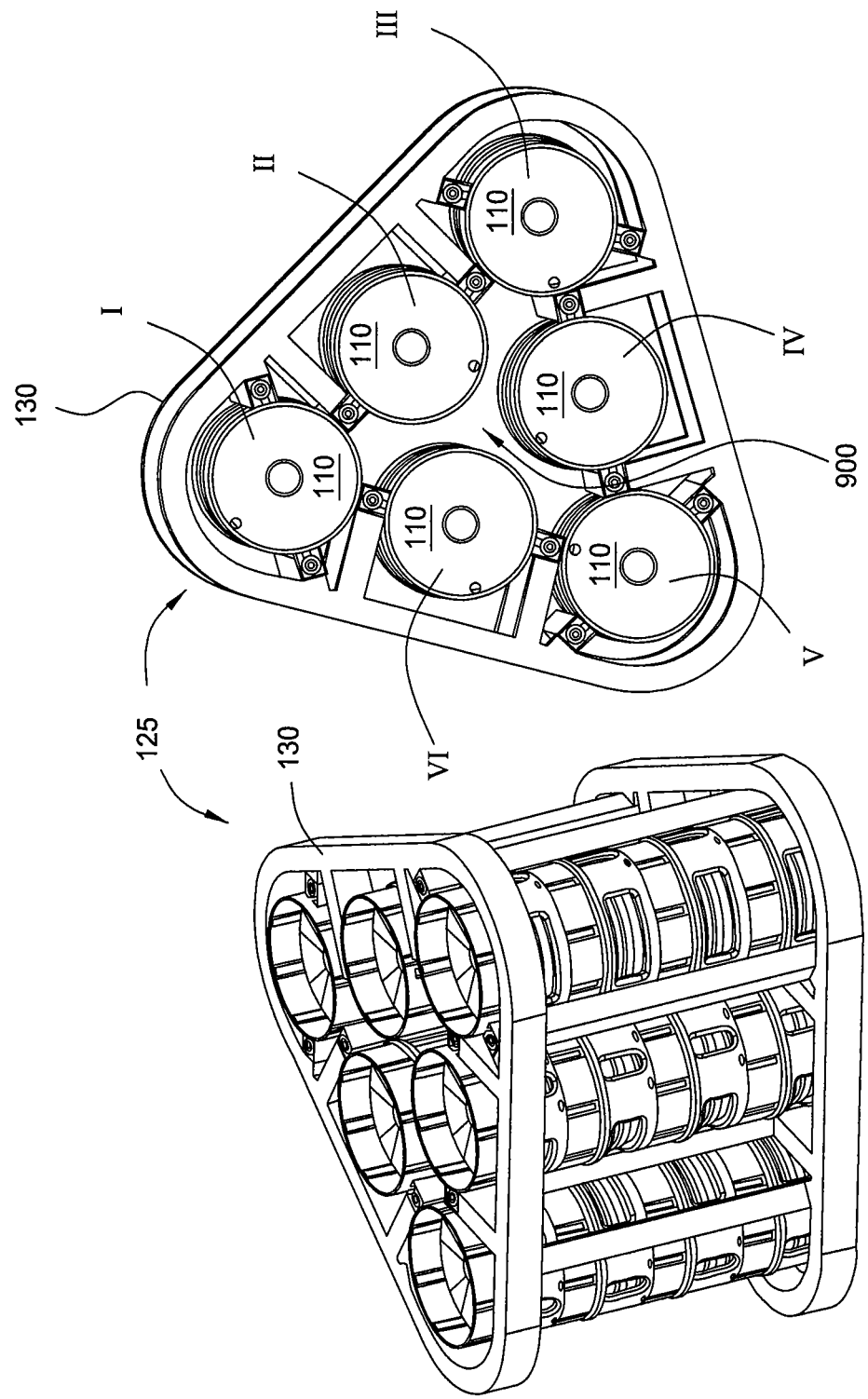

APPARATUS AND METHODS FOR AN OCEAN BOTTOM SEISMIC SENSOR DEPLOYMENT VEHICLE

CROSS-REFERENCE TO RELATED APPLICATIONS

This application claims benefit of U.S. Provisional Patent Application Ser. No. 61/309,771, filed Mar. 2, 2010, which is incorporated herein by reference.

BACKGROUND OF THE INVENTION

1. Field of the Invention

The present invention relates generally to the field of marine seismic data acquisition, in particular to ocean bottom seismic (OBS) recording, and deployment and retrieval of seismic receivers.

2. Description of the Related Art

Oil and gas exploration and production professionals rely heavily on seismic data in their decision making. Seismic data is collected by introducing energy into the earths surface (known as shooting or a shot), recording the subsequent reflected, refracted and mode converted energy by a receiver, and processing these data to create images of the structures beneath the surface. Imaging the earth in this manner is complex and requires accurate information regarding the source and receiver locations that produced these data.

Both 2D and 3D seismic surveys are carefully preplanned. The planned locations for each shot and each seismic receiver is calculated so as to achieve the geophysical objectives of the survey, and the operations personnel attempt to follow the plan as accurately as possible. Some conventional methods used to record seismic data in marine environments create numerous challenges relating to accurate positioning of receivers, surface or subsurface noise, equipment malfunction and breakage, among other challenges.

For 4D seismic data collection and in other types of deep ocean seismic acquisition programs utilizing autonomous ocean bottom seismic receivers, the receivers are placed on and retrieved from the ocean bottom with expensive heavy work class remote operating vehicles (ROV's). While the use of ROV's provides highly accurate placement of the receiver units, the use of ROV's, and their associated vessels and support crews, is costly. It is not uncommon for ROV operations to exceed half the costs of the entire seismic survey. For example, the ROV operating costs may, in many cases, exceed 50 percent of the entire seismic program cost. Further, the heavy work class ROV's utilized in deep water applications are highly complex machines which are subject to mechanical failures. For this reason multiple ROV's are often employed. Still, ROV failures may delay the seismic operation for a prolonged period, further increasing the cost of the seismic survey.

Therefore, there exists a need for an apparatus and method for ensuring accurate positioning of seismic devices on the seafloor in deep water applications that is less expensive to maintain and operate.

SUMMARY OF THE INVENTION

Embodiments described herein relate to an apparatus and method for transferring one or more seismic sensor devices to or from a support vessel on or near a surface of a body of water and a subsurface marine location. In one embodiment, an apparatus for transferring seismic sensor devices is provided. The apparatus includes a frame structure having one or more rails disposed thereon, the one or more rails comprising an elevator mechanism and defining at least one exit path for one or more seismic sensor devices, and one or more motors coupled to the elevator mechanism.

In another embodiment, an apparatus for transferring seismic sensor devices is provided. The apparatus includes a frame structure having one or more pairs of linear rails disposed thereon defining at least one exit path for one or more seismic sensor devices, a drive mechanism disposed in at least one of the linear rails, and a motor coupled to the drive mechanism.

In another embodiment, a method for placing seismic sensor devices on a seafloor is provided. The method includes suspending a frame structure in a water column from a surface vessel, the frame structure having a first end and a second end containing one or more columns comprising a plurality of sensor devices, actuating a drive device to move the plurality of sensor devices in one of the one or more columns toward the second end and releasing a first sensor device from one of the one or more columns out of the second end of the frame structure at a first intended locational position on the seafloor, and moving the suspended frame structure to a second intended locational position on the seafloor.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A is a partial cross-sectional view of the frame of FIG. 3.

FIG. 4B is an enlarged view of the feed mechanism shown in FIG. 4A.

FIGS. 8A-8C show various embodiments of a cable bundle that may be utilized to tether one or more of the seismic sensor devices.

FIG. 8D is a schematic view of another embodiment of a seismic sensor device deployment operation in a body of water.

FIG. 11 is an isometric cross-sectional view of one embodiment of a frame section that may be utilized with the automated baskets as described herein.

FIGS. 13A and 13B are isometric views of another embodiment of an automated basket.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein relate to an apparatus and method for transferring one or more seismic sensor devices to or from a support vessel on or near a surface of a body of water and a subsurface marine location. The apparatus and method as described herein is configured to be utilized in deep water having depths of 500 meters or greater. However, similar procedures could be used in shallower bodies of water. The support vessel may be a marine vessel, such as a boat, a ship, a barge or a floating platform adapted to store and transfer a plurality of seismic sensor devices. Each of the seismic sensor devices as described herein may be a discrete subsurface sensor, for example, sensors and/or recorders, such as ocean bottom seismometers (OBS), seafloor seismic recorders (SSR), and similar devices. SSR's are typically re-usable and may be recharged and serviced before re-deployment. The seismic sensor devices may be configured to record autonomously, communicate by wireless connections, or configured to communicate through cables. The SSR's contain electronics in sealed packages, and record seismic data within an on-board recorder while deployed on the seafloor as opposed to digitizing and transmitting the data to an external recorder. The recorded data is obtained by retrieving the seismic sensor devices from the seafloor.

Figure 1:
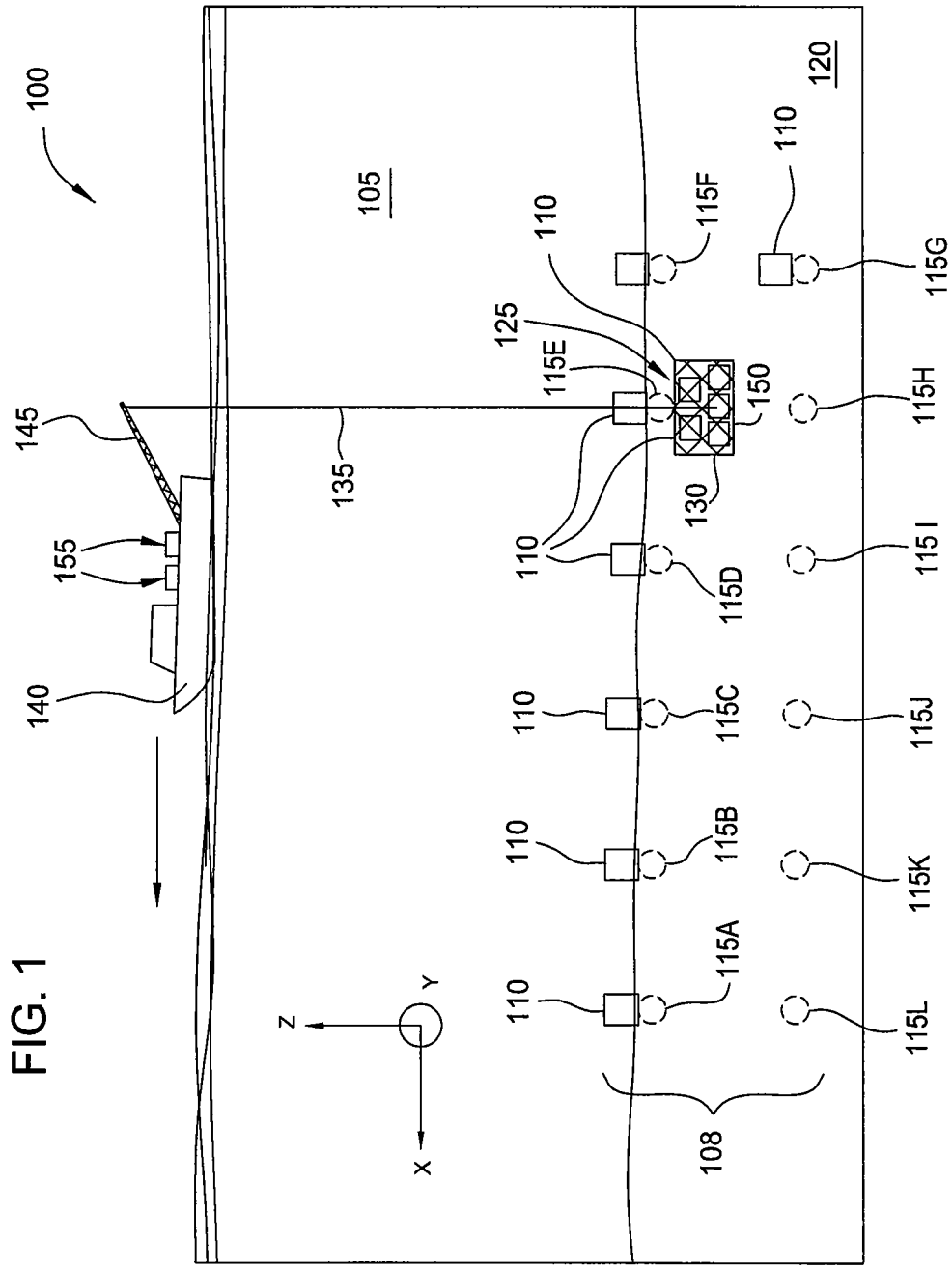
FIG. 1 is a schematic view of one embodiment of a seismic sensor device deployment operation in a body of water.

FIG. 1 is a schematic view of one embodiment of a seismic sensor device deployment operation 100 in a body of water 105. The deployment operation 100 includes precise placement of seismic sensor devices 110 on a seafloor 120 of the body of water 105 to form an array 108 of seismic sensor devices 110. The seafloor 120 may be a bottom surface of the body of water 105. The array 108 may form a pattern of columns and rows of seismic sensor devices 110 on the seafloor 120 or the array 108 may take many other forms to facilitate the seismic survey. After the seismic sensor devices 110 are deployed and resting on the seafloor 120, a seismic data collection may be initiated by inducing source energy (i.e., acoustic energy or a shot) into the body of water 105.

The deployment operation 100 comprises suspending an automated basket 125 by a cable 135 to a specified depth above the seafloor 120. In one embodiment, the automated basket 125 comprises a container structure adapted to contain a plurality of seismic sensor devices 110. The automated basket 125 includes a frame 130 that contains and facilitates placement of one or more seismic sensor devices 110 on the seafloor 120. The cable 135 is coupled to a support vessel 140, which in one embodiment is a marine vessel, such as a boat or ship. The cable 135 may be adapted to provide power, control signals and/or information signals between the support vessel 140 and the automated basket 125. The cable 135 may include conductive portions or other signal and power carrying medium, such as wires or fiber optic cable(s) adapted for signal transmission. The cable 135 may be coupled to a crane 145 or alternately a launch and recovery system (LARS) disposed on the support vessel 140. The crane 145 facilitates vertical (Z direction) movement to lift and lower the frame 130 relative to the support vessel 140 and/or the seafloor 120. The support vessel 140 is adapted to move the frame 130 horizontally (X and/or Y direction) to facilitate accurate positioning of the frame 130 relative to a plurality of intended locational positions 115A-115L on the seafloor 120. Once the frame 130 is in position adjacent the intended locational positions 115A-115L, a metering mechanism 150 disposed on the automated basket 125 allows a single seismic sensor device 110 to exit the frame 130 and rest at one of the intended locational positions 115A-115L. Intended locational positions as used herein describes a predetermined location as opposed to a random location. For example, an intended locational position may be preplanned based on topography of the seafloor 120, spacing requirements for the each seismic sensor device 110, and/or a historical placement position or location.

The support vessel 140 includes storage capacity for additional seismic sensor devices 110. In one embodiment, the seismic sensor devices are stored in replacement containers or baskets 155 that may be configured similarly to the automated basket 125. In this embodiment, when one automated basket 125 has been depleted of seismic sensor devices 110, the empty automated basket 125 may be lifted to the support vessel 140 and stowed on board. The crane 145 may be coupled to a replacement basket 155 and lowered in the body of water 105 to continue deployment of seismic sensor devices 110. The empty automated basket 125 may be stored or reloaded with additional seismic sensor devices 110 for later deployment while the replacement basket 155 is utilized in the continued deployment operation. In another embodiment, another loaded replacement basket 155 may be lowered from the support vessel 140 via a second crane or LARS to carry on deployment at, or prior to, depletion of another automated basket 125. In another embodiment, a reloader device (not shown) having a payload of additional seismic sensor devices 110 is lowered from the support vessel 140 to replenish the supply of seismic sensor devices 110 in an automated basket 125 that is utilized for deployment.

After the seismic survey is completed, seismic sensor devices 110 are retrieved from the seafloor 120. In one aspect, the seismic sensor devices 110 may be connected with a rope or cable (not shown) that can facilitate retrieval of all seismic sensor devices 110 coupled to the rope or cable by the support vessel 140. In another aspect, the seismic sensor devices 110 may be retrieved with a container adapted to receive the seismic sensor devices 110 and store the retrieved seismic sensor devices 110 for subsequent transfer to the support vessel 140. In yet another aspect, a remotely operated vehicle (ROV) may be utilized in the retrieval operation. Once the seismic sensor devices 110 are on board the support vessel 140, the seismic sensor devices 110 are coupled to data retrieval devices adapted retrieve recorded data from each of the seismic sensor devices 110. After the data retrieval is complete, the seismic sensor devices 110 are recharged, serviced, and stored on the support vessel 140 for later deployment.

Figure 2A:
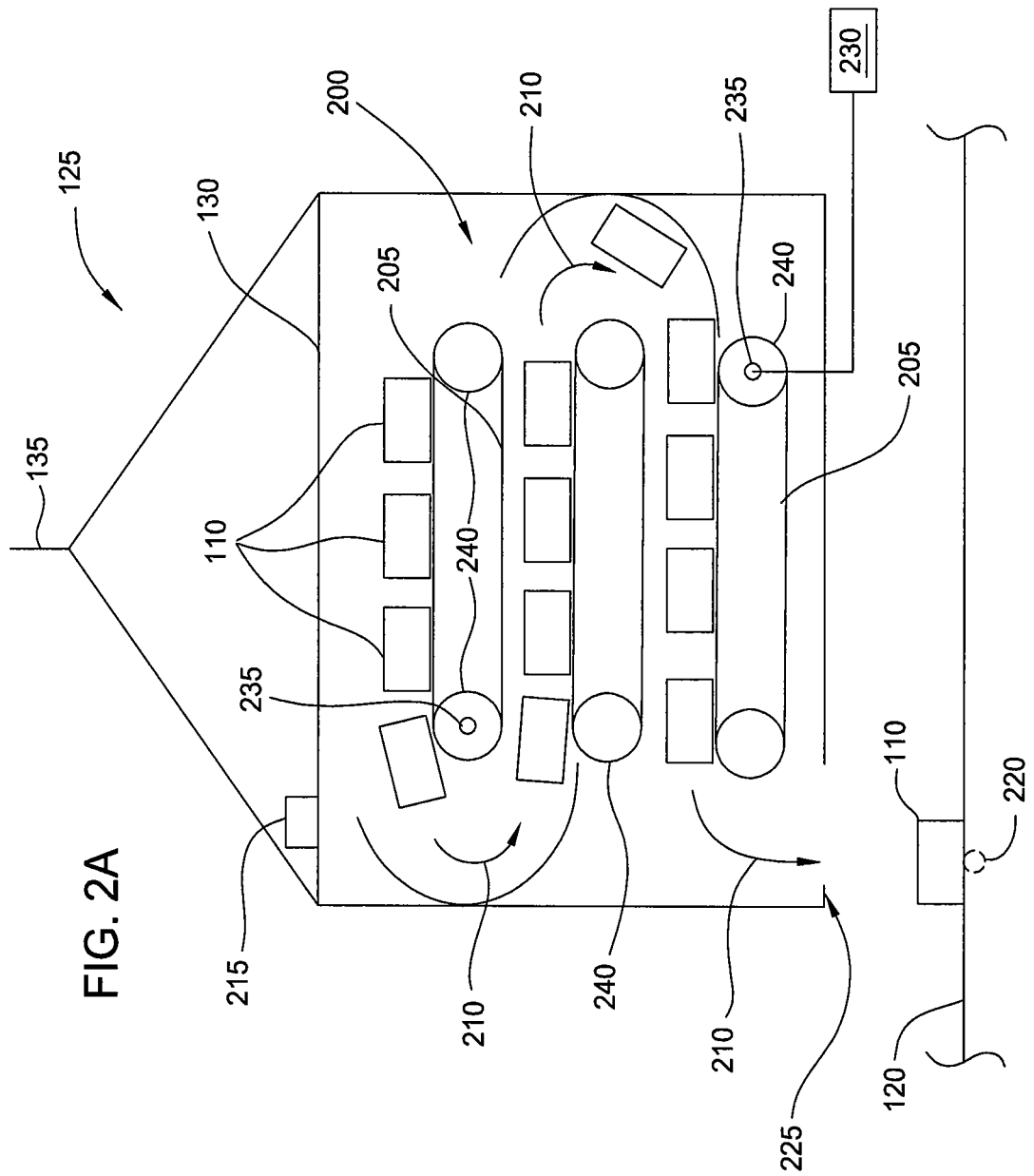
FIG. 2A is a schematic cross-sectional view of one embodiment of an automated basket.

FIG. 2A is a schematic cross-sectional view of one embodiment of an automated basket 125 that may be utilized in the deployment operation of FIG. 1. In this embodiment, the frame 130 is configured to contain a plurality of seismic sensor devices 110 on a conveyor device 200. In this embodiment, the conveyor device 200 includes at least one movable belt 205 adapted to support and move one or more of the seismic sensor devices 110 along a transfer path 210. One or more motors 235 are operably coupled to one or more rollers 240 to selectively move the belt 205.

In one aspect, the conveyor device 200 moves the plurality of seismic sensor devices 110 along the transfer path 210 toward an exit region 225 in the frame 130. The exit region 225 may be generally defined as an opening formed in the frame 130 that is sized to allow a seismic sensor device 110 to pass through and out of the frame 130. The exit region 225 may be an opening in the frame 130 that may be selectively opened and closed. In one embodiment, the exit region is an opening in the frame 130 that is selectively opened and closed by a door or gate (not shown). In another embodiment, the exit region 225 may be an opening formed in the frame 130 that remains open to allow the seismic sensor devices 110 to pass therethrough as the conveyor device 200 is actuated.

In one embodiment, the automated basket 125 includes an instrument package, such as a control device 215, adapted to provide operational metrics to the automated basket 125 and information to the support vessel 140 (not shown in this view). The control device 215 may facilitate transmission of signals to the frame 130 for operation of various drive systems on the automated basket 125. The control device 215 may also include various instruments to provide operational information to the support vessel 140. The control device 215 provides information such as location, inclination, acceleration, speed, course over the ground, depth and orientation metrics. The control device 215 may include an acoustic transponder, an inertial or Doppler navigation device, an inclinometer, accelerometer and other instrumentation to facilitate locational or operational metrics of the automated basket 125. The operational information may be transmitted to the support vessel 140 and used to position the frame 130 according to a desired positional location 220 where a seismic sensor device 110 is to be placed on the seafloor 120. The support vessel 140 may use the location information and other operational metrics to move the frame 130 to facilitate precise placement of the seismic sensor device 110 at the desired positional location 220.

In one mode of operation, the conveyor device 200 is coupled to a controller 230 to selectively control actuation of the one or more motors 235 and thus the movement of the belt 205. The controller 230 may be disposed on the automated basket 125 or the support vessel 140 (not shown). The controller 230 is adapted to receive signals from personnel on the support vessel 140 or operate according to a program to provide selective actuation of the one or more motors 235. Thus, in one embodiment, the selective movement of the conveyor device 200 controlled by the controller 230 provides a metering mechanism as described in FIG. 1. In one mode of operation, the support vessel 140 provides positioning of the automated basket 125 over the desired positional location 220. Once the automated basket 125 is in position, the controller 230 actuates the conveyor device 200 to deposit a seismic sensor device 110 at the desired positional location 220. After the seismic sensor device 110 is deposited on the seafloor 120, the support vessel 140 moves the automated basket 125 to the next desired positional location 220.

Figure 2B:
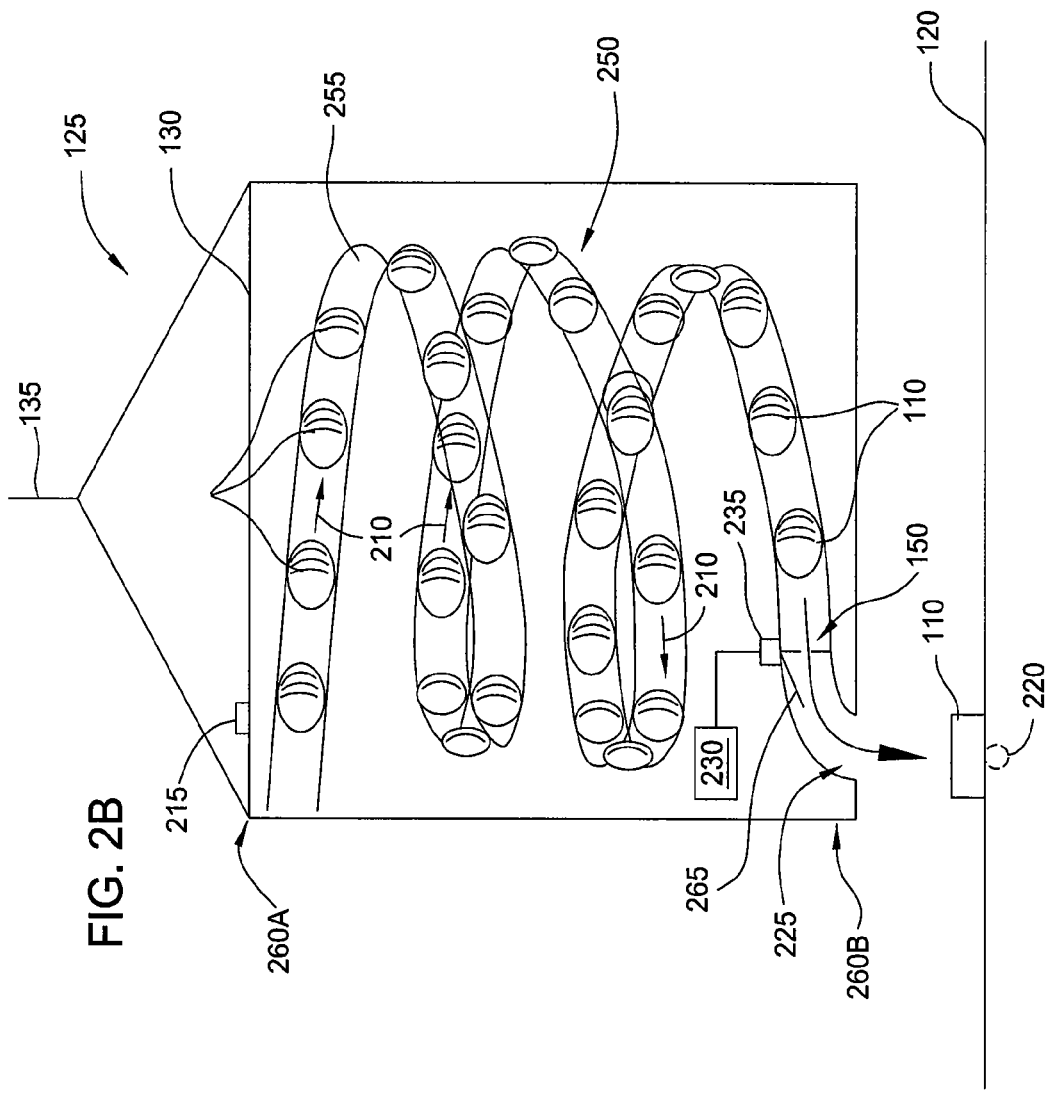
FIG. 2B is a schematic cross-sectional view of another embodiment of an automated basket.

FIG. 2B is a schematic cross-sectional view of another embodiment of an automated basket 125 that may be utilized in the deployment operation of FIG. 1. In this embodiment, the frame 130 is configured to contain a plurality of seismic sensor devices 110 on a gravity feed mechanism 250. In one embodiment, the gravity feed mechanism 250 comprises a helical track 255. The track 255 is pitched from a first end 260A to a second end 260B to enable a transfer path 210. The transfer path 210 carries one or more seismic sensor devices 110 toward an exit region 225. The track 255 may be a tubular conduit or one or more structural elements configured to form a framework that enables seismic sensor devices 110 to be contained and move along the transfer path 210.

In this embodiment, the automated basket 125 includes a gate or door 265 that provides a metering mechanism 150 for the gravity feed mechanism 250 as described in FIG. 1. The door 265 is operably coupled to a motor 235 that is in communication with a controller 230. In one mode of operation, the support vessel 140 provides positioning of the automated basket 125 over the desired positional location 220. Once the automated basket 125 is in position, the controller 230 actuates the door 265 to deposit a seismic sensor device 110 at the desired positional location 220. After the seismic sensor device 110 falls through the exit region 225 and is deposited on the seafloor 120, the door 265 is closed to meter any movement of additional seismic sensor devices 110. The support vessel 140 then moves the automated basket 125 to the next desired positional location 220.

Figure 2C:
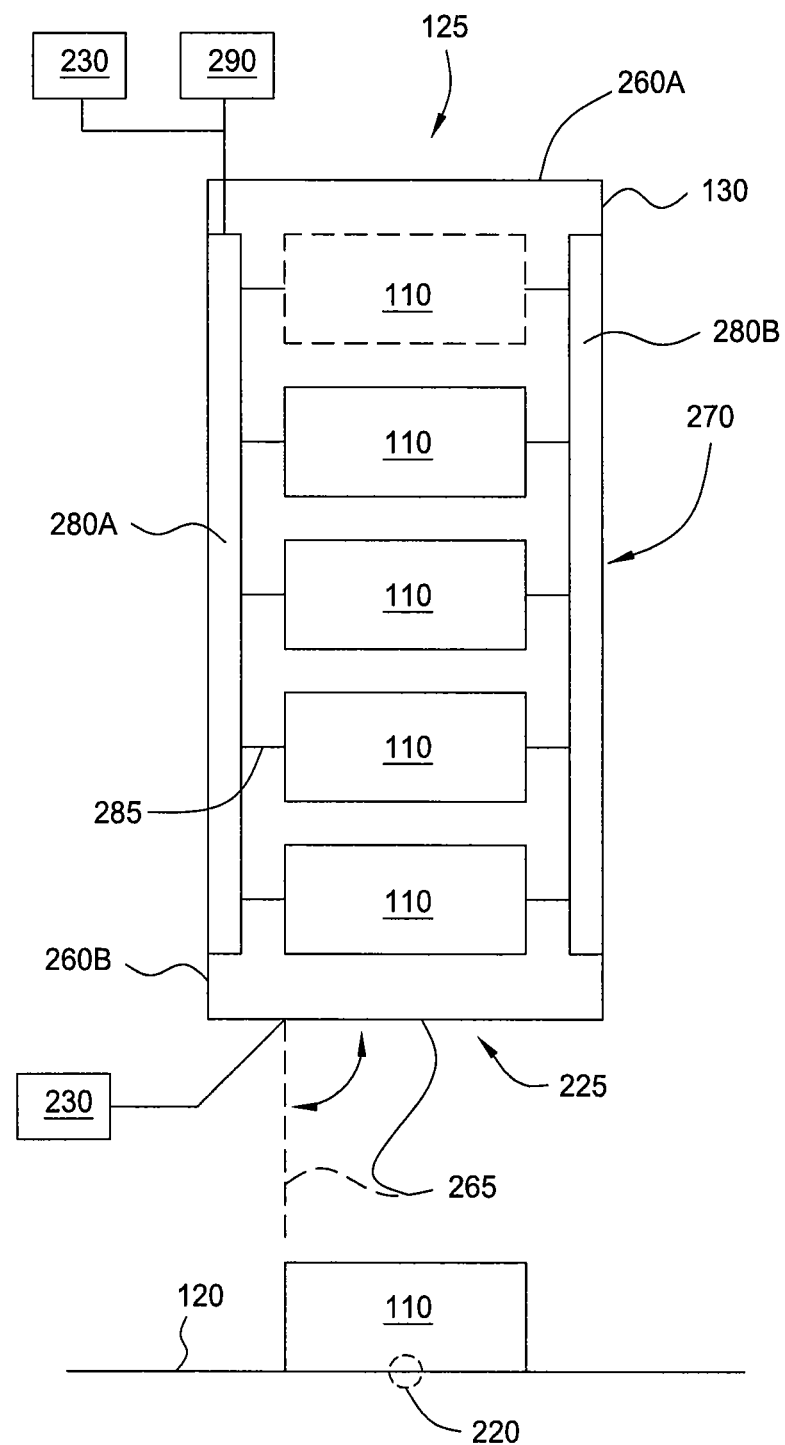
FIG. 2C is a schematic cross-sectional view of another embodiment of an automated basket.

FIG. 2C is a schematic cross-sectional view of another embodiment of an automated basket 125 that may be utilized in the deployment operation of FIG. 1. In this embodiment, the frame 130 includes a first end 260A and a second end 260B configured to contain a plurality of seismic sensor devices 110 on a track. In this embodiment, the track is defined by a feed mechanism 270. In this embodiment, the plurality of seismic sensor devices 110 are stacked in a linear configuration and are provided to an exit region 225 at the second end 260B thereof. In one embodiment, the feed mechanism 270 is at least partially assisted by gravity. In one aspect, the feed mechanism 270 is configured as an elevator mechanism that facilitates movement and dispensing control of one or more seismic sensor devices 110. A motor (not shown) may be coupled to the elevator mechanism to control movement of the feed mechanism 270 and dispensing of seismic sensor devices 110.

In one embodiment, metering or control of the plurality of seismic sensor devices 110 is provided by a gate or door 265 coupled to a controller 230. In one aspect, each of the plurality of seismic sensor devices 110 are moved by gravity toward the door 265. The lowermost seismic sensor device 110 is deposited on the seafloor 120 and the remaining seismic sensor devices 110 are advanced to a position closer to the second end 260B of the frame 130. In one aspect, the plurality of seismic sensor devices 110 are supported along linear rails 280A, 280B. When the door 265 is opened, a seismic sensor device 110 falls through the exit region 225 and is deposited on the seafloor 120 at the desired positional location 220. After the seismic sensor device 110 falls through the exit region 225 and is deposited on the seafloor 120, the door 265 is closed to stop any transfer of additional seismic sensor devices 110 though the exit region 225. The support vessel 140 then moves the automated basket 125 to the next desired positional location 220.

In another embodiment, one or both of the linear rails 280A, 280B provide metering of the plurality of seismic sensor devices 110. In one aspect, the linear rails 280A, 280B capture attachment members 285 that are coupled with a drive mechanism 290. The drive mechanism 290 generally includes gears, one or more pulleys or a sprocket coupled to a belt, a screw, gears, a chain or a geared belt (all not shown). Each of the attachment members 285 provide the mechanism for the seismic sensor devices 110 to be controllably coupled to the drive mechanism 290. In this embodiment, the door 265 may not be utilized for controlling movement of the seismic sensor devices 110. In this embodiment, the controller 230 is coupled to the drive mechanism 290 to control actuation of the drive mechanism 290. In operation, the drive mechanism 290 is energized and the belt, screw, gear or chain, comprising the drive mechanism 290, within the linear rails 280A, 280B is advanced. The advancement of the drive mechanism 290 moves the seismic sensor devices 110 and a single seismic sensor device 110 is transferred through the exit region 225 and dispensed out of the automated basket 125 and onto the seafloor 120 at the desired positional location 220. After the seismic sensor device 110 is transferred through the exit region 225 and is dispensed from the automated basket 125, the belt, screw, gears or chain comprising the drive mechanism 290 is stopped to stop movement of additional seismic sensor devices 110 though the exit region 225. The support vessel 140 then moves the automated basket 125 to the next desired positional location 220 and dispensing of other seismic sensor devices 110 may be provided as described above.

In one embodiment, the conveyor device 200 of FIG. 2A, the gravity feed mechanism 250 of FIG. 2B, and the feed mechanism 270 of FIG. 2C comprises an elevator mechanism to move seismic sensor devices 110 from the first end 260A of the frame 130 to a second end 260B of the frame 130.

Figure 3:
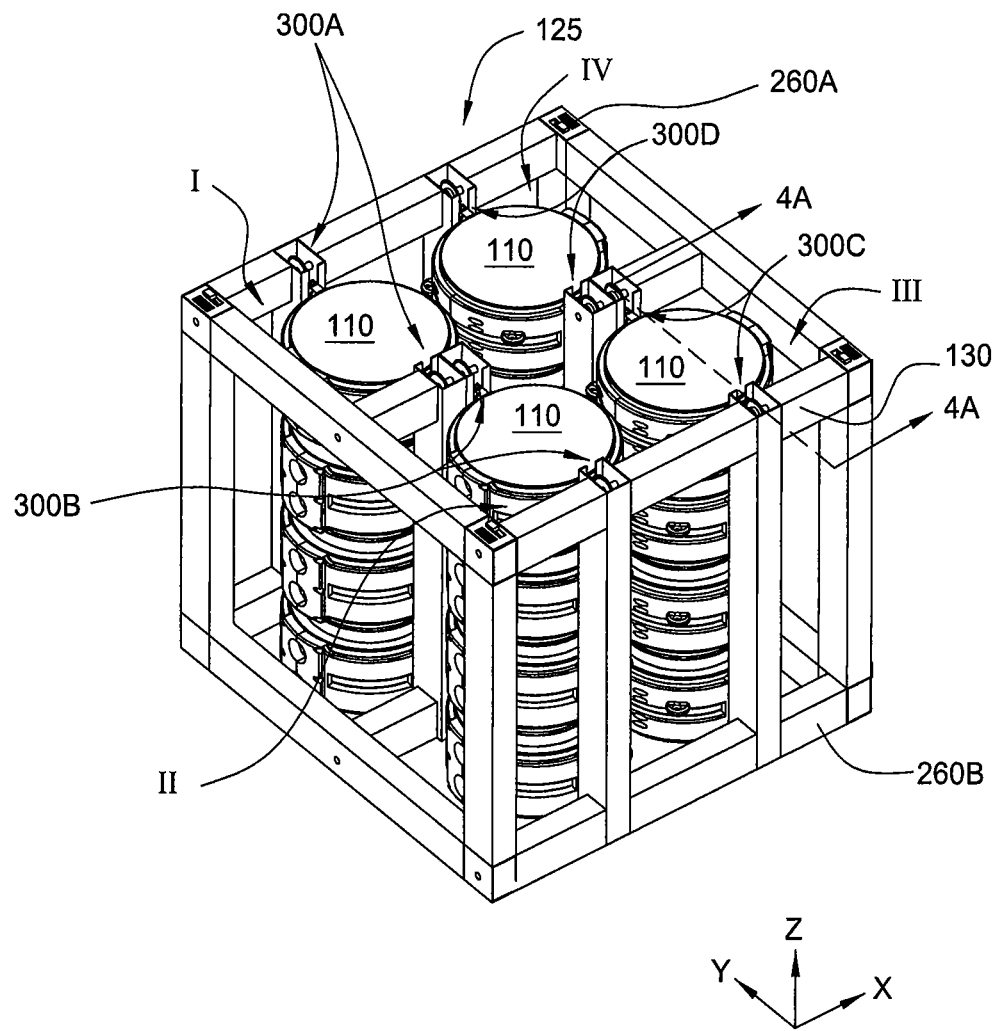
FIG. 3 is an isometric view of another embodiment of an automated basket.

FIG. 3 is an isometric view of another embodiment of an automated basket 125 that may be utilized in the deployment operation 100 of FIG. 1. In this embodiment, the automated basket 125 comprises a frame 130 containing a plurality of feed mechanisms 300A-300D defining a multi-path deployment device.

In the embodiment shown in FIG. 3, each of the feed mechanisms 300A-300D comprise columns I-IV containing seismic sensor devices 110 that may be deposited on the seafloor 120 (not shown). In one embodiment, each of the columns I-IV may define discrete transfer paths for the seismic sensor devices 110 contained therein. In one embodiment, each column I-IV is adapted to sequentially dispense seismic sensor devices 110 in a pattern such that one seismic sensor device 110 is released out of the automated basket 125 from one of the columns I-IV and subsequent seismic sensor devices 110 may be sequentially released from neighboring columns. As single seismic sensor devices 110 are released by each column, the seismic sensor devices 110 remaining in the automated basket 125 move longitudinally downward in the respective column I-IV closer to the second end 260B of the frame 130.

For example, a first seismic sensor device 110 may be released from column I at a first intended locational position on the seafloor 120 (FIG. 1). After the first seismic sensor device is dispensed, the support vessel 140 (FIG. 1) moves toward a second intended locational position on the seafloor 120. When the automated basket 125 is in position adjacent the second intended locational position, a second seismic sensor device 110 may be released from column II at the second intended locational position on the seafloor 120. Third and fourth seismic sensor devices 110 may be released from columns III and IV at third and fourth intended locational positions on the seafloor 120, respectively. After a fourth seismic sensor device 110 is released, a fifth seismic sensor device 110 may be released from column I again. The release pattern may continue to columns II-IV, and return to column I again. As single seismic sensor devices 110 are released by each column I-IV, the seismic sensor devices 110 remaining in the automated basket 125 move longitudinally downward in the respective column I-IV closer to the second end 260B of the frame 130 to be in position for release. The release pattern may be repeated until the automated basket 125 is depleted of seismic sensor devices 110. In one embodiment, the sequential release of seismic sensor devices 110 forms a release pattern that is circular or in a "round-robin" pattern.

FIG. 4A is a partial cross-sectional view of the frame 130 of FIG. 3 showing one embodiment of a feed mechanism 300C. In this embodiment, the feed mechanism 300C comprises a sprocket 405 and a flexible member 410 that interfaces with one or more attachment members 285 disposed on the seismic sensor device 110. The attachment member 285 both securely captures the seismic sensor device 110 and provides the appropriate interface to be advanced by the feed mechanism 270. The flexible member 410 may be a chain or belt. The attachment members 285 stabilize the seismic sensor device 110 in the X, Y and Z directions when the sprockets 405 are synchronized. As the sprocket 405 is rotated, the flexible member 410 moves and the seismic sensor device 110 is controllably advanced in the Z direction.

FIG. 4B is an enlarged view of the feed mechanism 300C shown in FIG. 4A. FIG. 4B shows the interface between the flexible member 410 and an attachment member 285. In this embodiment, the flexible member 410 is a chain 415 and the attachment member 285 includes a combination of channels 425A and teeth 425B that interface with the chain 415. The chain 415 includes protruded links 420 that interface with the channels 425A formed in the attachment member 285. In one embodiment, the protruded links 420 include rollers 430 adapted to decrease friction between the protruded links 420 and the attachment member 285.

Figure 4C:
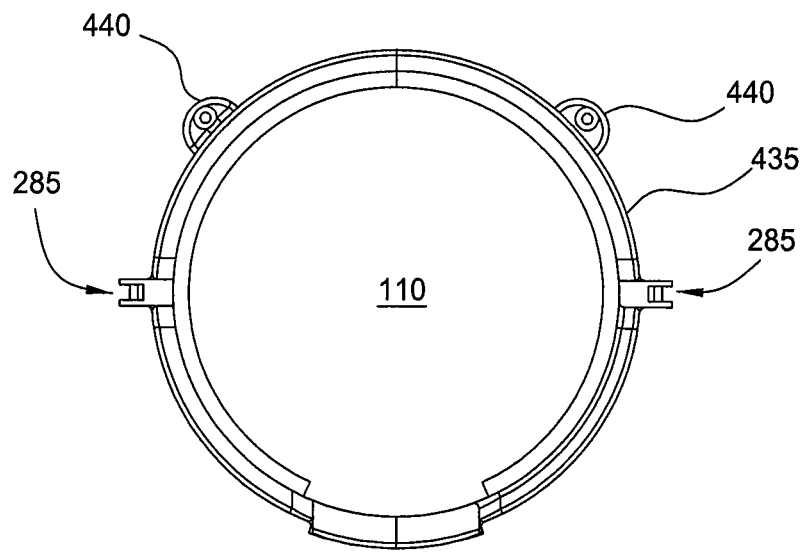
FIG. 4C is a top plan view of one embodiment of a seismic sensor device.

FIG. 4C is a top plan view of one embodiment of a seismic sensor device 110. In this embodiment, the attachment members 285 are formed on an outer surface 435 of the seismic sensor device 110. The outer surface of the attachment members 285 may also include one or more attachment features 440 that may be utilized to attach retrieval ropes or cables.

Figure 4D:
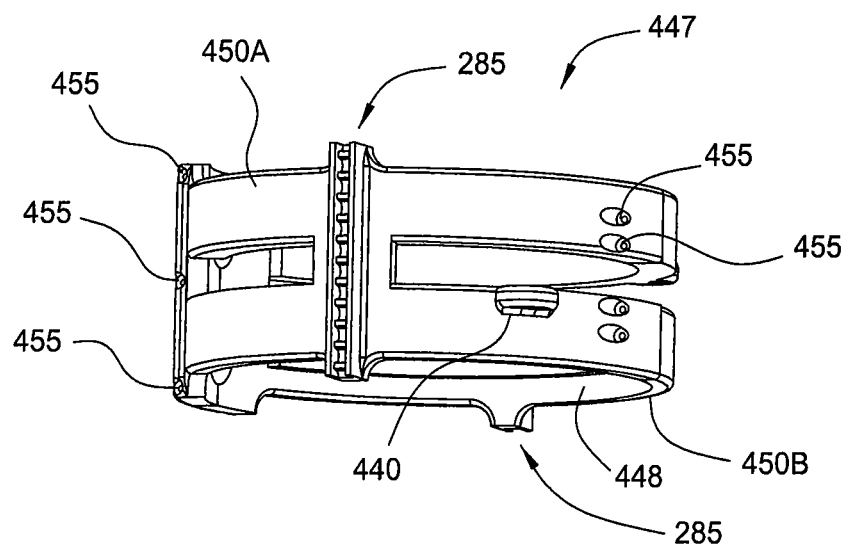
FIG. 4D is an isometric view of one embodiment of a bracket adapted to be disposed on a seismic sensor device.

FIG. 4D is an isometric view of one embodiment of a bracket 447 adapted to capture a seismic sensor device (not shown) within its inner diameter 448. In one embodiment, the bracket 447 is a clamshell type device having two portions 450A and 450B adapted to be disposed around a seismic sensor device and be secured by fasteners 455. The bracket 447 includes a plurality of attachment members 285 disposed on an outer surface of the bracket 447 for interfacing with the feed mechanisms 300A-300D (shown in FIG. 3) or 270 (shown in FIG. 2C). The bracket 447 also includes attachment features 440 disposed on an outer surface of the bracket 447 that may be utilized to attach retrieval ropes or cables.

Figure 5:
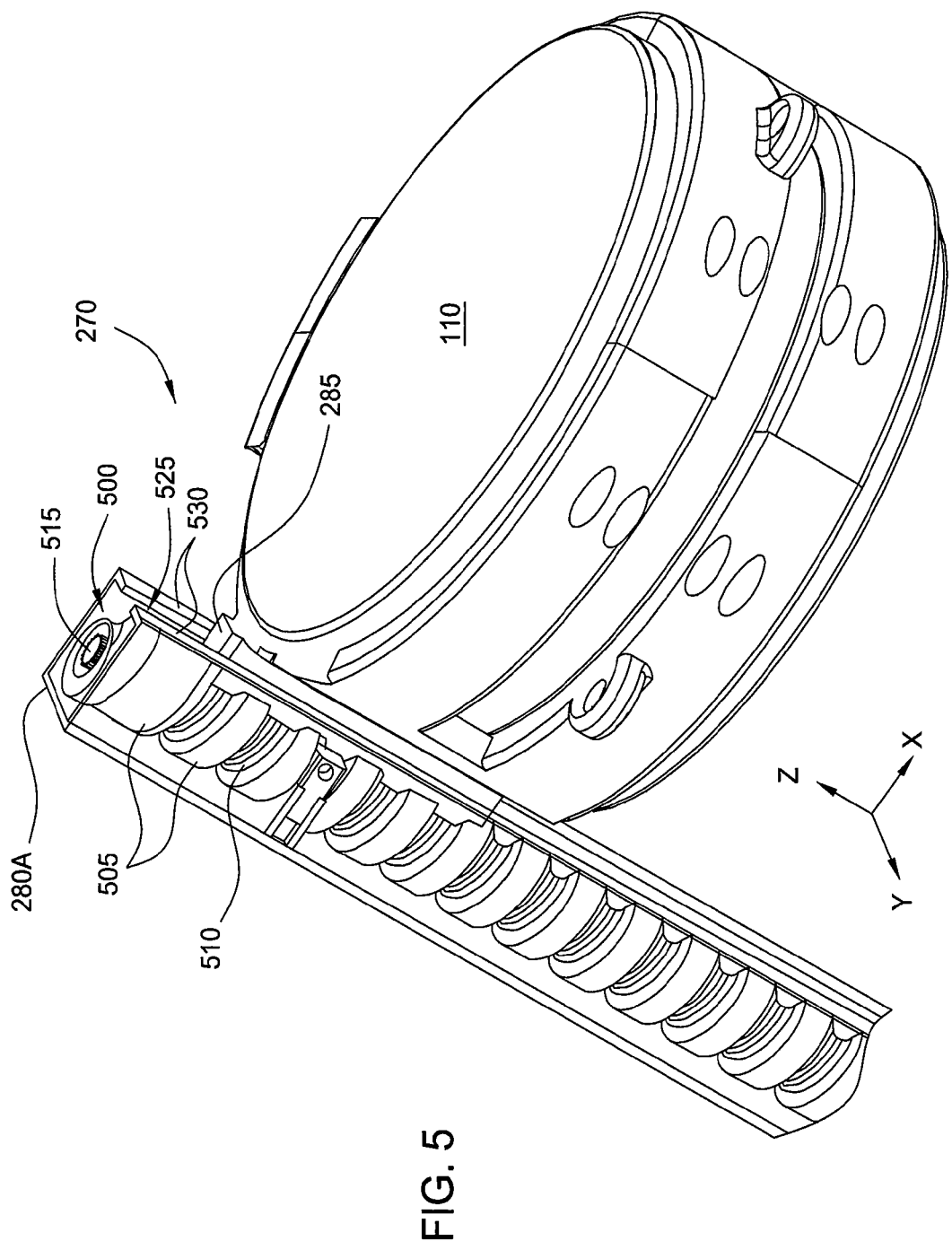
FIG. 5 is an isometric view of another embodiment of a feed mechanism that may be used with the automated basket shown in other Figures.

FIG. 5 is an isometric view of another embodiment of a feed mechanism 270 that may be used with the automated basket 125 shown in FIGS. 1, 2C and 3. The feed mechanism 270 shown in this embodiment may also be utilized as the feed mechanisms 300A-300D (shown in FIG. 3). In this embodiment, the feed mechanism 270 comprises a screw device 500 having circumferential teeth 505 separated by grooves 510. The screw device 500 is disposed in the linear rail 280A and interfaces with the attachment member 285 as shown. The screw device 500 includes a spline 515 that is adapted to mate with another spline, gear, shaft, or a motion device via a mated broached sleeve or bushing, such as the drive mechanism 290 described in FIG. 2C. While not shown, another linear rail having a screw device 500 coupled to another attachment member may be disposed in an opposing relationship to the linear rail 280A.

The attachment member 285 stabilizes the seismic sensor device 110 in the X, Y and Z directions when the screw device 500 is stationary or synchronized with its opposing screw device 500 (described above and not shown). As the spline 515 is rotated, the attachment member 285 and the seismic sensor device 110 captured within are advanced in the Z direction. In this embodiment, the linear rail 280A includes a slot 525 formed between at least two sidewalls 530. The slot 525 runs along a longitudinal dimension of the linear rail 280A and is sized slightly greater than a width of the attachment member 285. The slot 525 allows Z directional movement of the attachment member 285 while preventing or minimizing lateral movement of the attachment member 285.

Figure 6:
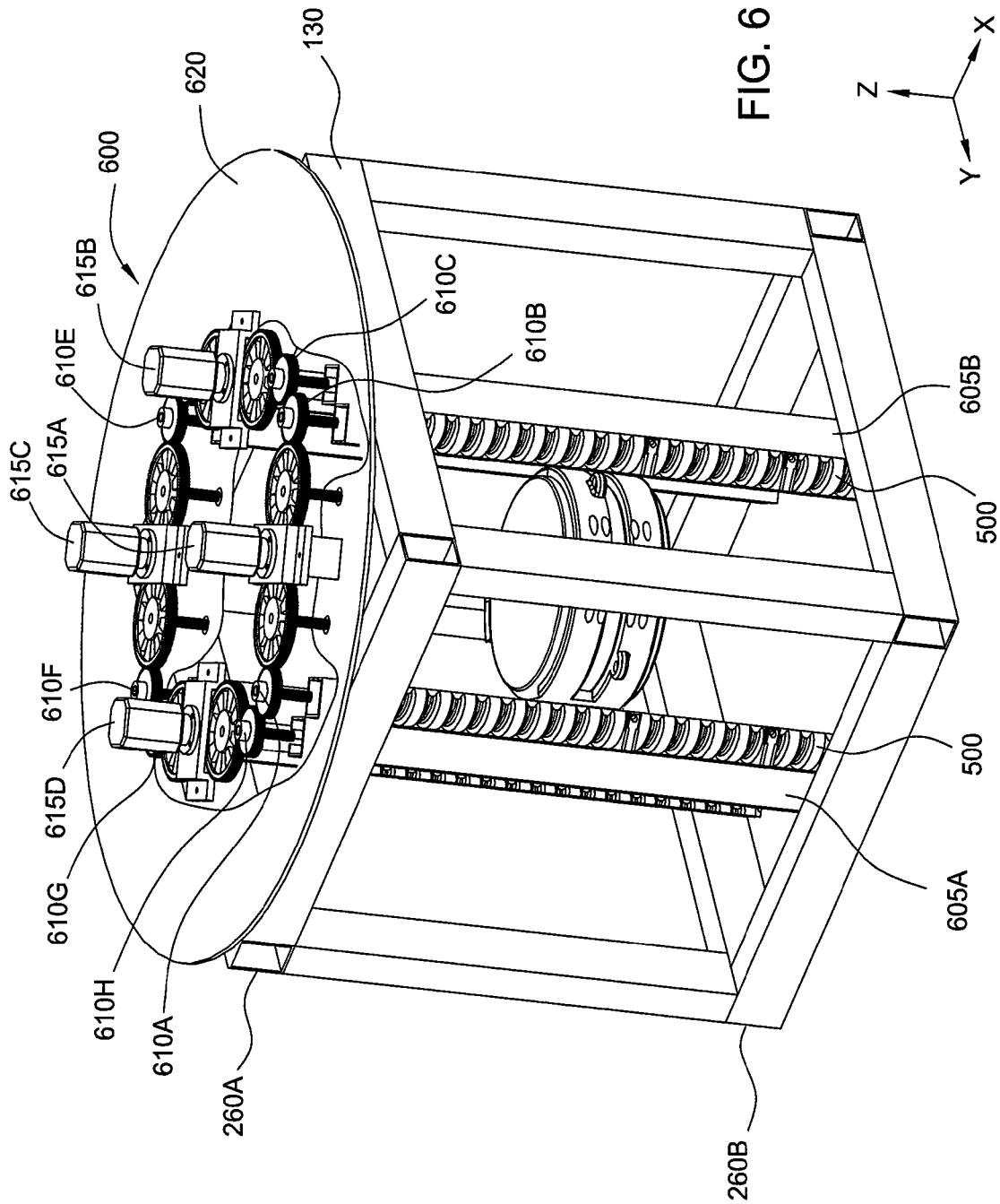
FIG. 6 is an isometric view of another embodiment of an automated basket.

FIG. 6 is an isometric view of another embodiment of an automated basket 125 that may be utilized in the deployment operation 100 of FIG. 1. A basket drive apparatus 600 is disposed on the first end 260A of a frame 130. In this embodiment, pairs of linear rails, such as rails 605A and 605B are configured to contain a column of seismic sensor devices 110 therebetween. While not all are seen in this view, the frame 130 in FIG. 6 is configured to contain four columns of seismic sensor devices 110 which define four parallel release paths for seismic sensor devices 110. In this embodiment, each of the 8 linear rails (two rails for each column/path) includes screw devices 500 coupled to gears 610A-610H (610D is hidden in this view) by splines and collars. In one embodiment, each of the gears 610A are coupled to actuators 615A-615D with gears such that one actuator drives two gears 610A and 610B and their coupled screw devices 500. Each of the actuators 615A-615D may be mounted to a deck or platform 620 disposed on the first end 260A of the frame 130.

Figure 7:
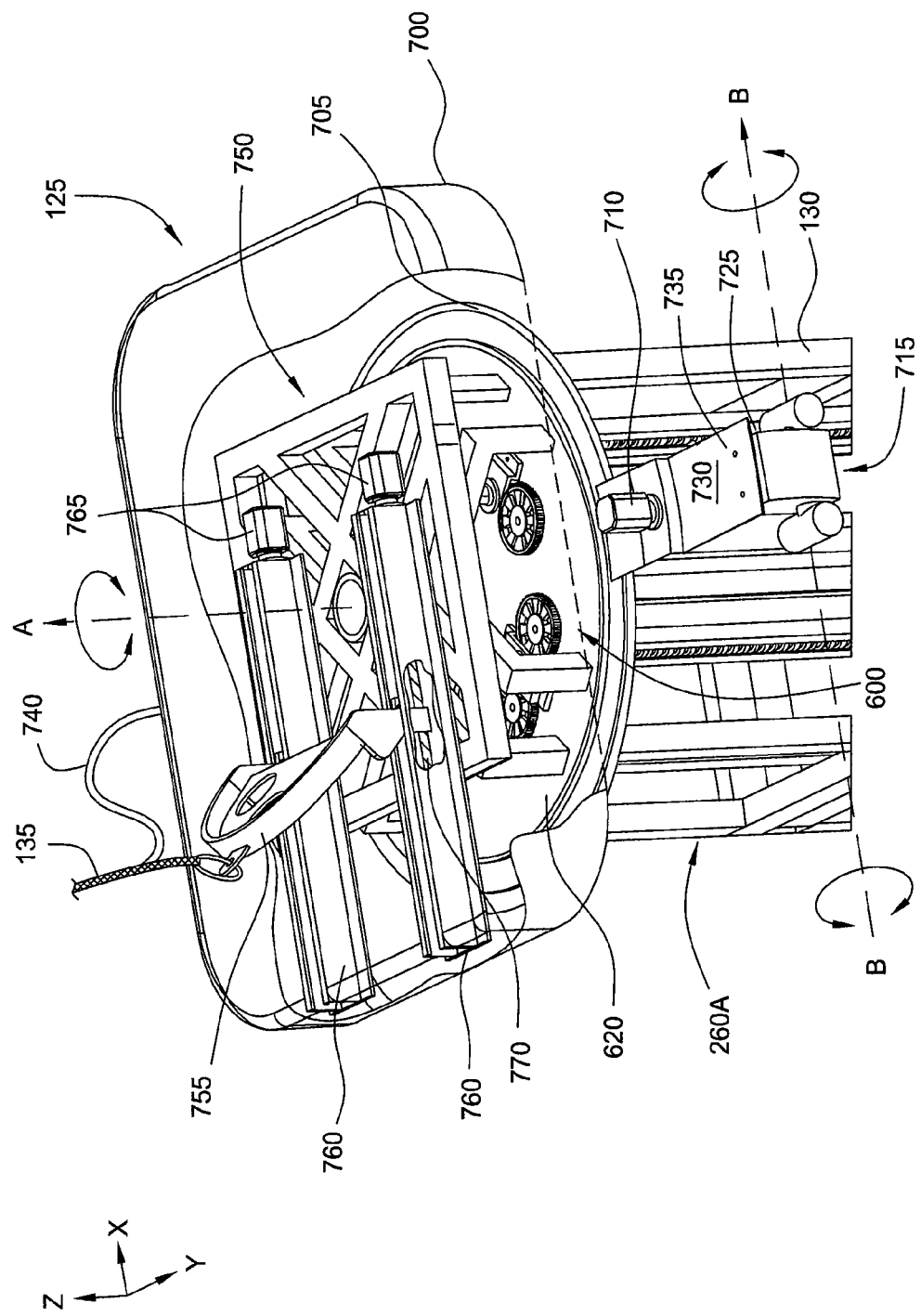
FIG. 7 is an isometric top view of another embodiment of an automated basket.

FIG. 7 is an isometric top view of another embodiment of an automated basket 125 having a buoyant lid or cover 700 disposed on the first end 260A of the frame 130. A portion of the cover 700 is cutaway to show portions of the platform 620 and a circular track 705 disposed on a periphery of the platform 620 and/or the frame 130. The circular track 705 couples with an actuator 710 that is coupled to a vision system 715. The vision system 715 comprises a camera 720 and lighting devices 725 coupled to a movable frame 730. In one embodiment, the movable frame 730 is moved relative to the frame 130 along the circular track 705 by the actuator 710 to position the vision system 715 to view sides of the frame 130 and/or structures and surfaces adjacent the automated basket 125. The vision system 715 is movable relative to the platform 620 about axis A in portions of a circular path up to and including 360°. In one embodiment, the circular track 705 is a ring gear and the actuator 710 is a hydraulic or electric motor adapted to interface with the circular track 705.

In one embodiment, each of the camera 720 and lighting devices 725 are coupled to a motor 735 that provides independent or synchronous motion to the camera 720 and lighting devices 725 about a rotational axis B. The movement of the vision system 715 provides viewing of portions of the automated basket 125 as well as viewing above, below, and to the sides of the automated basket 125. The movement of the vision system 715 also provides viewing of landscape forward and aft of the automated basket 125. A signal cable 740 coupled between the automated basket 125 and a support vessel (not shown) is provided on the cable 135. The signal cable 740 provides control signals to the actuators and motors of the automated basket 125 as well as transmitting image signals to the support vessel.

The automated basket 125 also includes a variable attachment device 750 which includes a cable attachment member 755 that is movable relative to the cover 700 and the frame 130. The variable attachment device 750 includes one or more tracks 760 that are disposed on the cover 700 that defines a movement path for the cable attachment member 755 in at least the X direction. The variable attachment device 750 allows selective movement of the cable attachment member 755 along the one or more tracks 760 to adjust the attitude or inclination of the automated basket 125. In one aspect, the variable attachment device 750 modifies the angular orientation of the longitudinal axis of the automated basket 125 due to changes in the center of mass of the automated basket 125 and/or in response to currents and resistance in the water column. For example, adjustment of the cable attachment member 755 may alleviate tilt or cause an intended tilt in the automated basket 125.

In one embodiment, the variable attachment device 750 includes the one or more tracks 760 and at least one of the one or more tracks 760 is coupled to an actuator 765. In this embodiment, the cable attachment member 755 is coupled to a linear movement mechanism 770 disposed in the one or more tracks 760. The linear movement mechanism 770 may be a screw or worm gear and the actuator 765 may be a hydraulic or electric motor that is coupled with the signal cable 740. The actuator 765 is coupled to the linear movement mechanism 770 and is selectively actuated to move the cable attachment member 755 in the X direction.

Figure 8A:
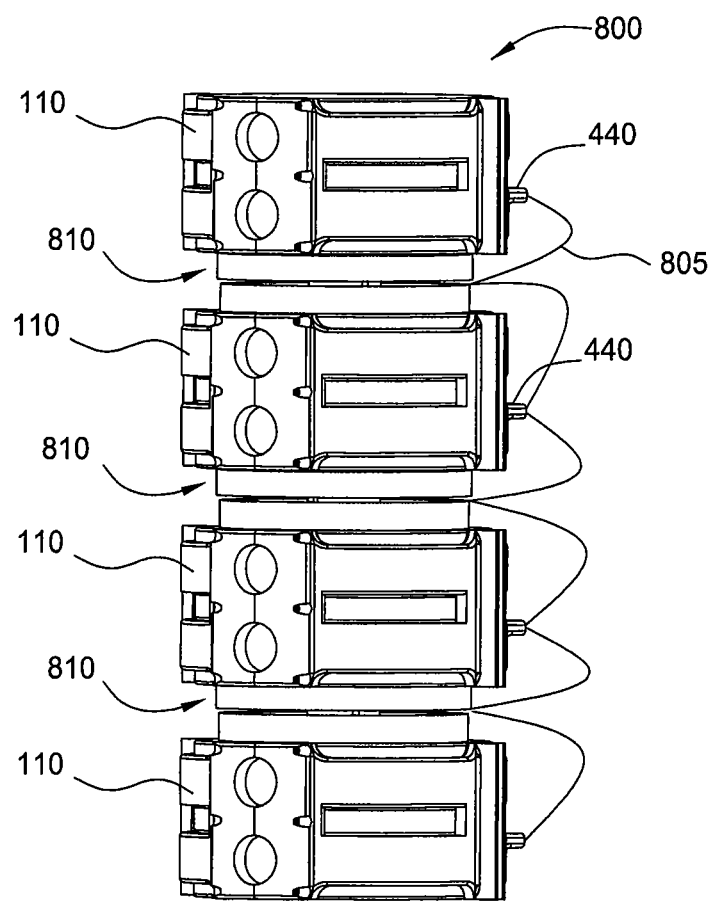
Figure 8B:
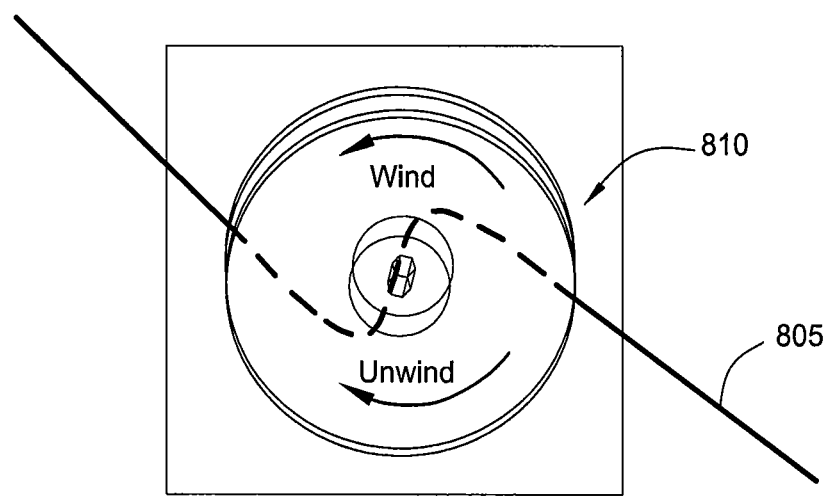

FIGS. 8A-8C are various views showing a cable bundle 810 that may be utilized to tether one or more of the seismic sensor devices 110. The cable bundle 810 comprises a length of rope or cable that is affixed to at least one seismic sensor device 110. The cable bundle 810 may be a wound or looped rope or cable having breakaway connections or may be a spool device capable of releasing and/or winding the rope or cable for storage. FIG. 8A is a side view of a column 800 of seismic sensor devices 110 which may be any of the columns I-IV shown in FIG. 3. In this embodiment, a cable 805 is coupled between each of the seismic sensor devices 110. The cable 805 is adapted to facilitate retrieval of the seismic sensor devices 110 when the seismic sensor devices 110 are raised from the seafloor 120. Prior to release from the linear rails 280A, 280B, the cable 805 is wound inside the cable bundle 810 which is a spool in one embodiment. In one aspect, each cable bundle 810 is sandwiched between or otherwise coupled to one or more of the seismic sensor devices 110. When a single seismic sensor device 110 is released, the cable 805 unwinds from the spool as shown in FIG. 8C.

FIG. 8D is a schematic view of another embodiment of a seismic sensor device deployment operation 820 in a body of water 105. In this embodiment, cable bundles 810 of FIGS. 8A-8C are utilized. In one example, a first cable bundle 810A is released from the automated basket 125. Subsequently, other seismic sensor devices 110 are released at intended locational positions 115A-115F. A cable 805 and a cable bundle 810A-810E is disposed between each of the seismic sensor devices 110 in order to tether the seismic sensor devices 110 together. In one aspect, the first cable bundle 810A includes a buoyancy device 830 coupled to a rope or cable 825. A weighted article (not shown) may be coupled between the buoyancy device 830 and the cable bundle 810A. Buoyancy devices 830 are well know to those skilled in the art and may float freely on the surface or be maintained below the surface and released for surface retrieval by a selectively actuated acoustic signal. Once actuated, the buoyancy device 830 rises to the surface of the water column where personnel on a support vessel, such as support vessel 140, may retrieve the cable 825. The cable 825 may be secured to retrieval machinery aboard the support vessel, such as the support vessel 140. Once coupled to the retrieval machinery, all seismic sensor devices 110 tethered together may be retrieved from the seafloor 120.

Figure 8E:
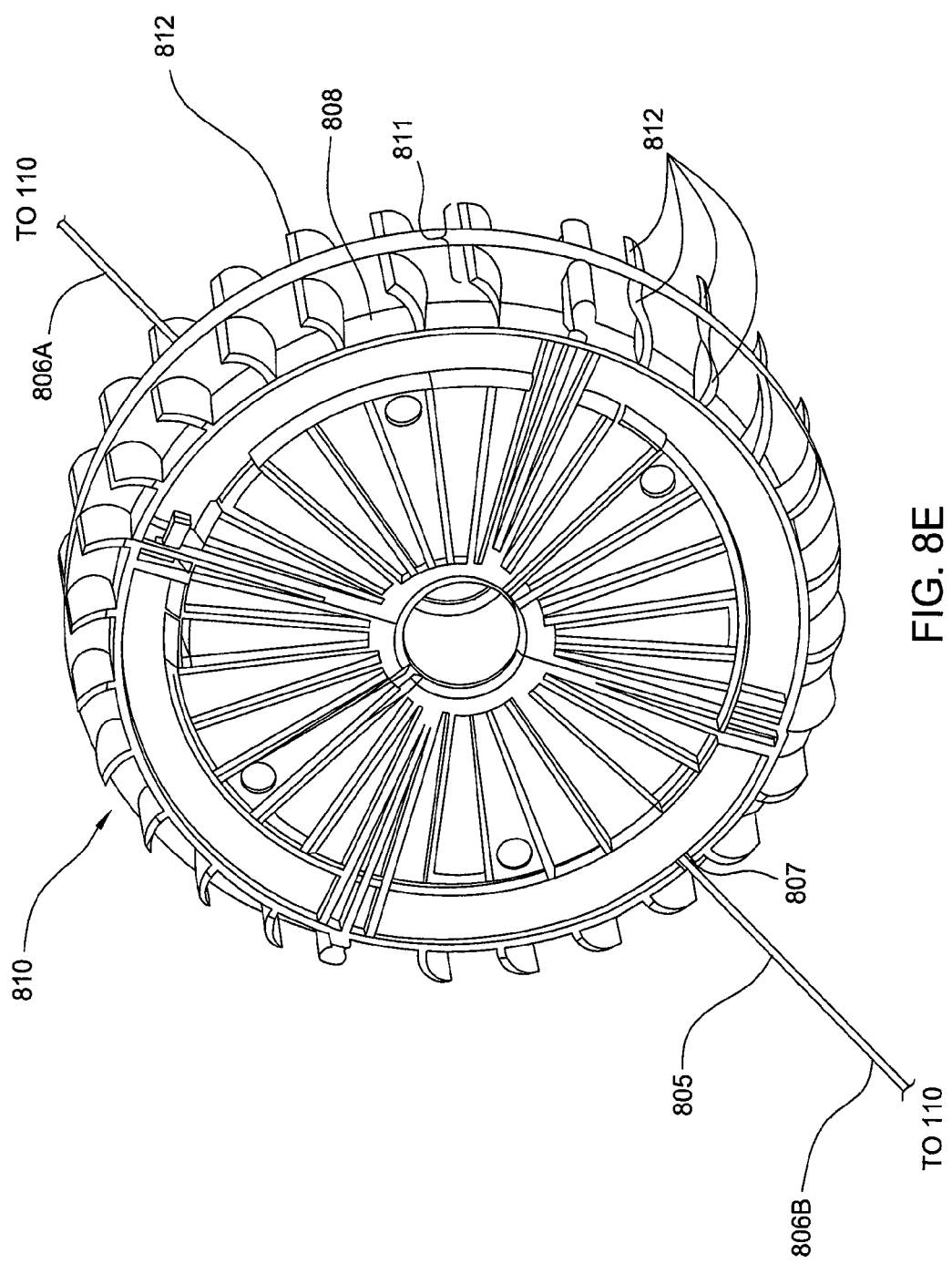
FIG. 8E shows one embodiment of cable bundle that may be utilized to tether one or more of the seismic sensor devices as described in FIGS. 8A-8C.

FIG. 8E shows one embodiment of cable bundle 810 that may be utilized to facilitate tethering of one or more of the seismic sensor devices 110 as described in FIGS. 8A-8C. In this embodiment, a retrieval cable 805 with a first end 806A and a second end 806B passes through a slot 807 in a sidewall 808 of the cable bundle 810. While not shown in this view, the first end 806A may pass through a slot formed in an opposing portion of the sidewall 808. A portion of the cable 805 between the first end 806A and the second end 806B may be wound and/or tensioned by machinery, such as springs (not shown) within the body of the cable bundle 810. Alternatively, a portion of the cable 805 between the first end 806A and the second end 806B may be wound around the sidewall 808 or a circumferential surface 811 of the cable bundle 810.

During deployment, in one embodiment, the cable bundle 810 is released from the automated basket 125 (not shown) together with a seismic sensor device 110 (not shown). The released seismic sensor device 110 is planted on the seafloor 120 (not shown) having the first end 806A of the cable 805 connected thereto while the second end 806B of the cable 805 is attached to the next to-be-released seismic sensor device 110 (not shown) still captured in the automated basket 125. As the automated basket 125 is moved away from the planted seismic sensor device 110 by motion of the support vessel 140, one or both of the first end 806A and the second end 806B becomes taut, and one or both of the first end 806A and second end 806B begins to pay out. In one aspect, the tautness and/or paying out of the cable 805 causes the cable bundle 810 to spin in the water column and/or be lifted from the seafloor 120. In one embodiment, a plurality of cup structures 812 are formed on or coupled to the sidewall 808 of the cable bundle 810. Each of the cup structures 812 may be curved blades or fins. In one aspect, the cup structures 812 facilitate maintenance of the attitude of the cable bundle 810 as the cable bundle 810 is spinning, thereby preventing unwanted motion of the cable bundle 810, such as rolling. In another aspect, the cup structures 812 facilitate slowing the rotational speed of the cable bundle 810, which maintains tautness of the cable 805 and/or prevents backlash or overspooling. In another aspect, the cup structures 812 prevent tangling of the cable 805 during payout by maintaining the attitude of the cable bundle 810 and slowing the rotational speed of the cable bundle 810. Thus, the first end 806A and the second end 806B of the rope are payed out during deployment with minimal resistance to prevent displacement of a previously placed or planted seismic sensor device 110 (not shown). Further, tangling is minimized to prevent displacement of a previously placed or planted seismic sensor device 110.

Figure 9A:
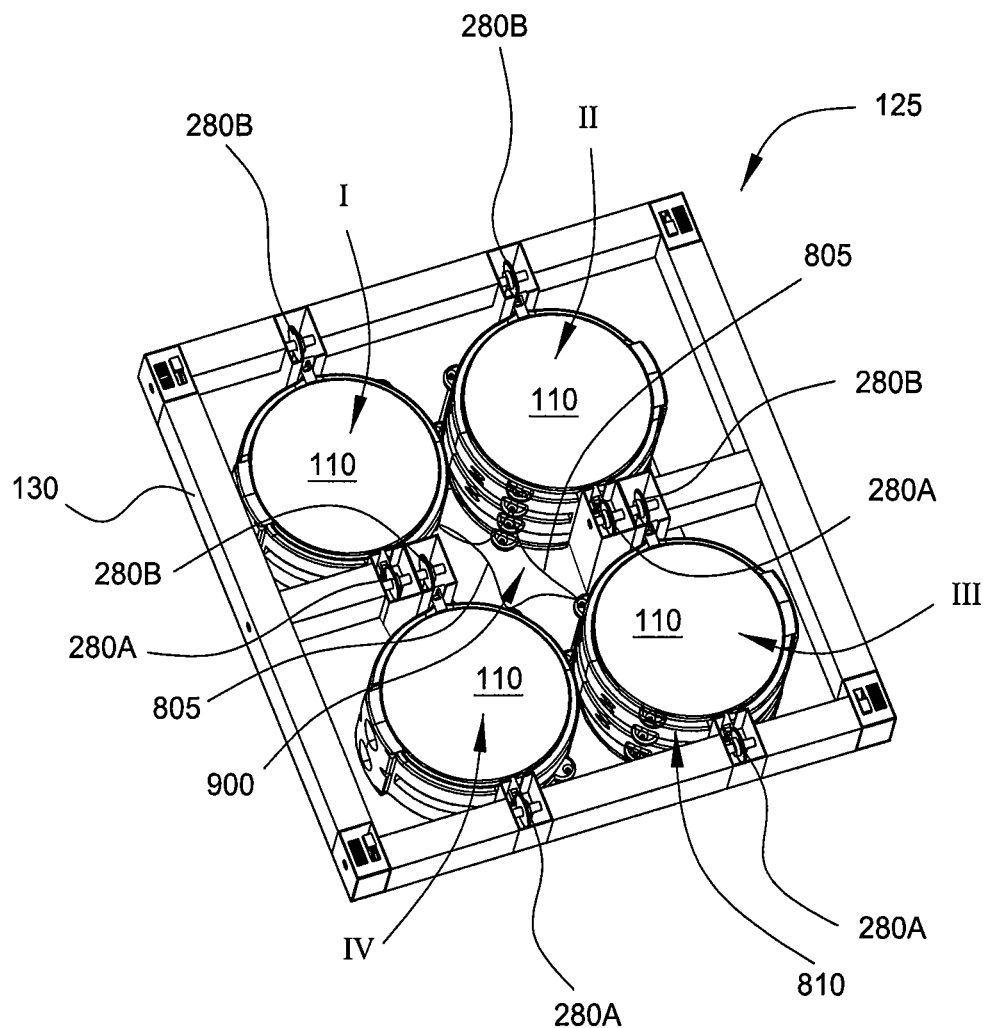
FIG. 9A is a schematic top view of another embodiment of an automated basket.

FIG. 9A is a schematic top view of one embodiment of an automated basket 125 having a plurality of seismic sensor devices 110 disposed therein. The plurality of seismic sensor devices 110 define columns I-IV disposed between linear rails 280A and 280B. In this embodiment, the frame 130 comprises a center area 900 that is open or free from machinery or obstructions that may snag or bind cables 805 that are disposed between the seismic sensor devices 110 in cable bundles 810 disposed between the seismic sensor devices 110. In one aspect, the center area 900 of the frame 130 defines an internal topological connection path for the cables' 805 serial or parallel connection to the seismic sensor devices 110. While only four columns I-IV of seismic sensor devices 110 are shown, the internal topological connection path may be suitable for as few as one column to greater than four columns of seismic sensor devices 110.

Figure 9B:
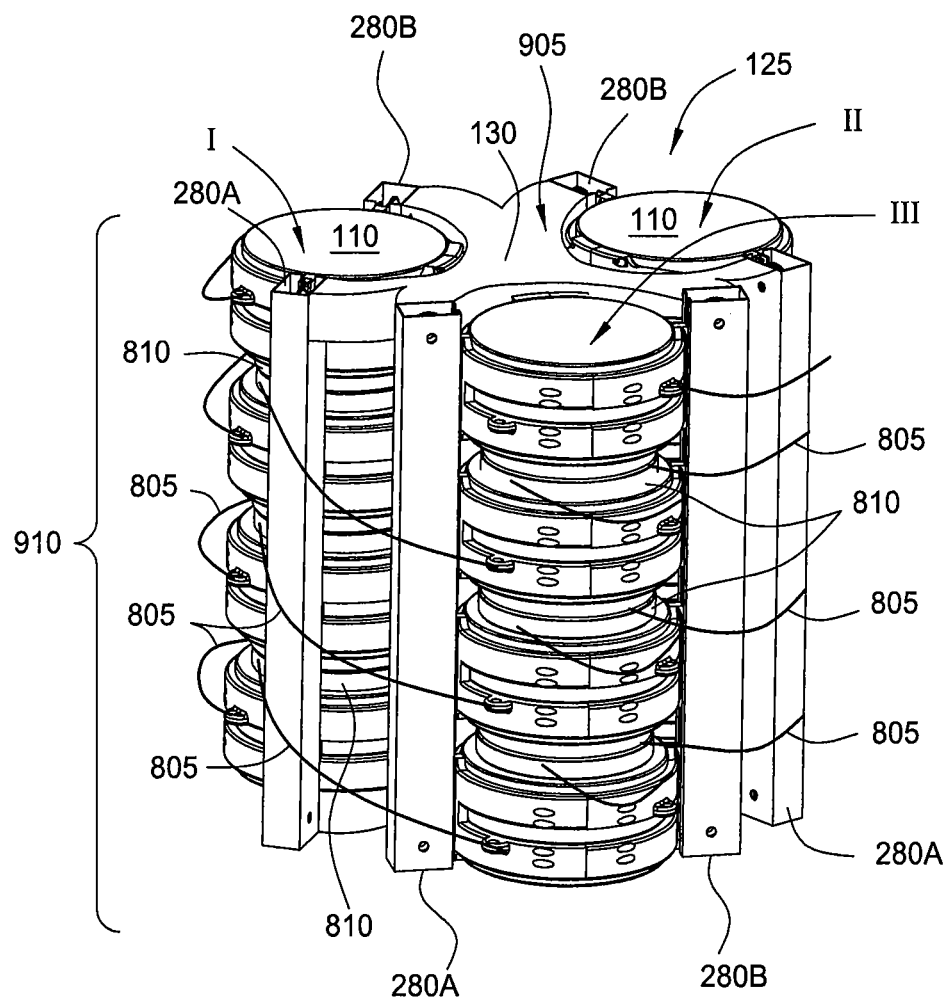
FIG. 9B is a schematic side view of another embodiment of an automated basket.

FIG. 9B is a schematic side view of another embodiment of an automated basket 125 having a plurality of seismic sensor devices 110 disposed thereon. The plurality of seismic sensor devices 110 define columns I-III disposed between linear rails 280A and 280B. In this embodiment, the frame 130 comprises a center area 905 that is closed and may form a portion of the frame 130. The outer boundary 910 of the automated basket 125 is open or free from obstructions that may snag or bind cables 805 that are disposed between the seismic sensor devices 110 in cable bundles 810. In one aspect, the outer boundary 910 of the automated basket 125 defines an external topological connection path for the cables' 805 parallel or serial connection to the seismic sensor devices 110. While only three columns I-III of seismic sensor devices 110 are shown, this open external topology configuration may be suitable for fewer or more than three columns of seismic sensor devices 110.

Figure 10A:
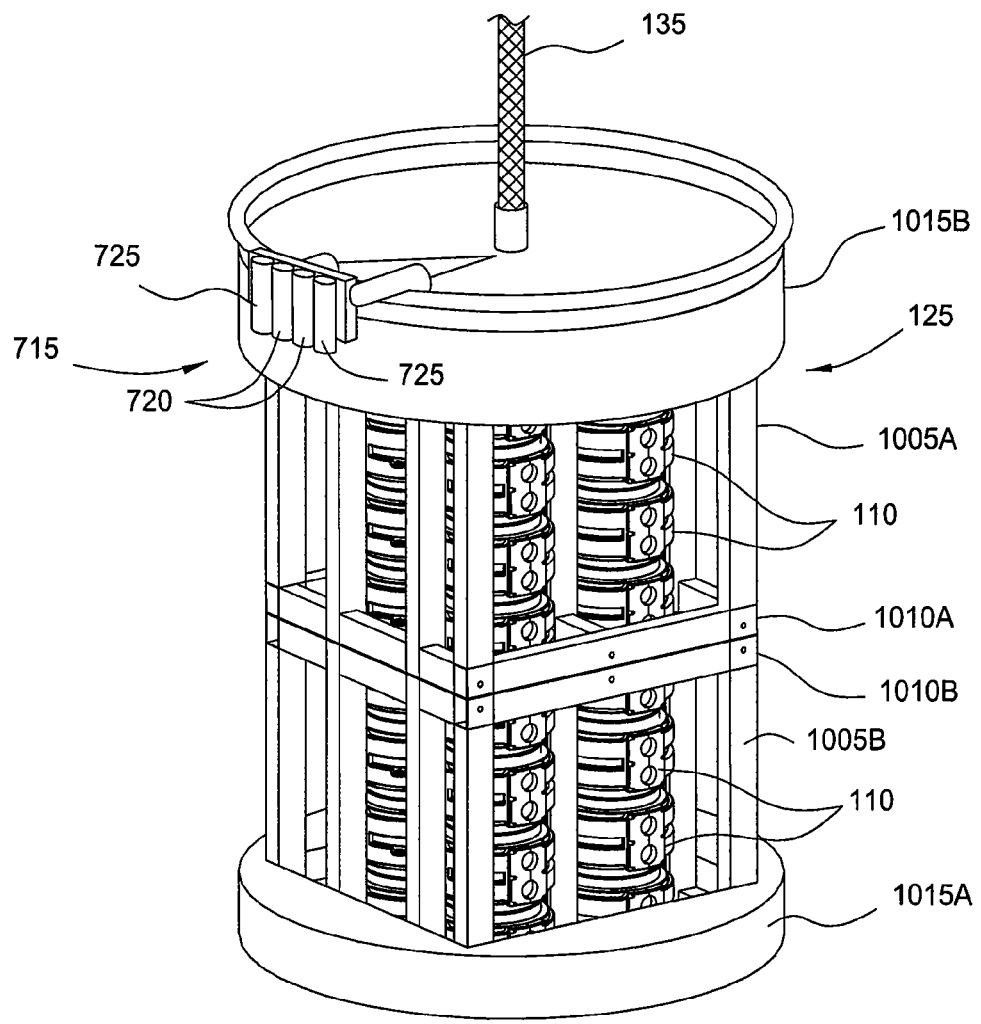
FIG. 10A is an isometric side view of another embodiment of an automated basket.

FIG. 10A is an isometric side view of another embodiment of an automated basket 125. In this embodiment, the automated basket 125 comprises at least two frame sections, such as a first frame section 1005A and a second frame section 1005B, which are each configured similarly to the frame 130 described in other Figures. In one embodiment, the frame sections 1005A, 1005B are attached end to end in a stacked configuration in order to maintain longitudinal conformity of the columns of seismic sensor devices 110 along the respective exit paths. In one embodiment, each of the frame sections 1005A, 1005B include mating ends 1010A, 1010B, respectively. At least one of the mating ends 1010A, 1010B include coupling mechanisms (not shown) adapted to attach and detach the frame sections 1005A, 1005B in a modular configuration.

In one embodiment, the automated basket 125 includes a base 1015A and a cover 1015B. In one embodiment, the base 1015A is adapted as a ballast ring to provide a landing platform and to lower the center of gravity of the automated basket 125 thus facilitating stability of the automated basket 125. The cover 1015B houses drive components as described in FIG. 6 and facilitates attachment of and suspension by one or more cable(s) 135. In one embodiment, the cover 1015B may also comprise or be filled with a buoyant material, such as foam or a substance that is less dense than water. In another embodiment, the cover 1015B may be configured to provide negative buoyancy for added stability. The cover 1015B also supports a vision system 715 having one or more cameras 720 and lighting devices 725.

Figure 10B:
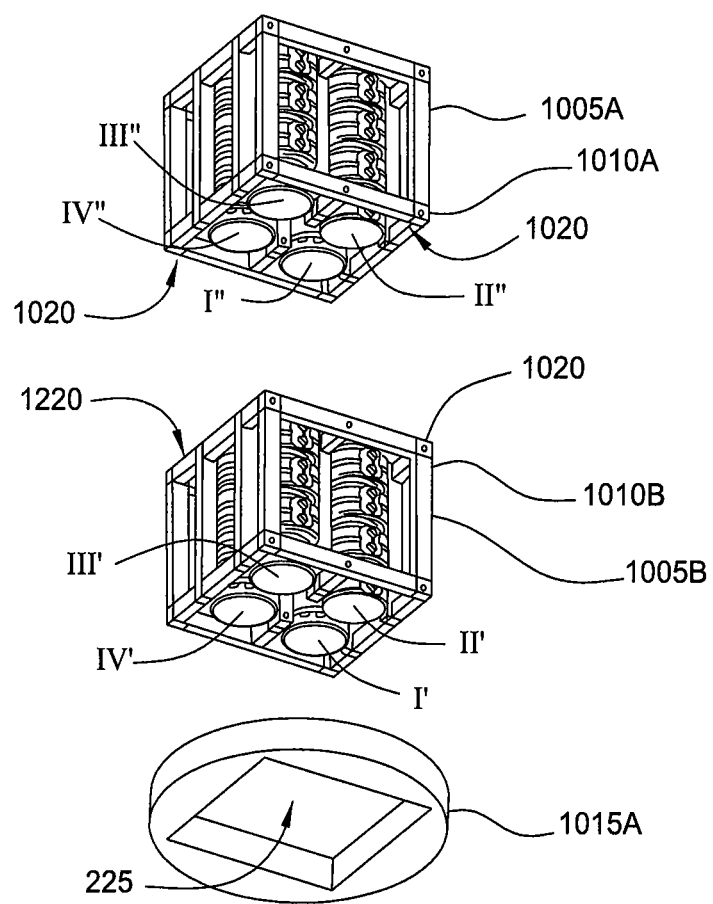
FIG. 10B is an exploded view of the automated basket shown in FIG. 10A.

FIG. 10B is an exploded view of the automated basket 125 shown in FIG. 10A. In this embodiment, each of the frame sections 1005A, 1005B contain four columns I'-IV' and I"-IV'" of seismic sensor devices 110 although the frame sections 1005A, 1005B may contain more or less than four columns I'-IV' and I"-IV'". In one mode of operation, each of the seismic sensor devices 110 would be sequentially deposited through an exit region 225 formed in the base 1015A to an intended locational position on the seafloor (not shown). In one example, a single first seismic sensor device 110 is released from column I' in the first frame section 1005B and the devices above descend along the path defined by that column causing seismic sensor devices 110 from the second frame section 1005B to enter the first frame section 1005A. A single second seismic sensor device 110 may be released from column II' in the first frame section 1005B and the devices above descend along the path defined by that column causing seismic sensor devices 110 from the second frame 1005B to enter the first frame section 1005A. A single third and fourth seismic sensor device 110 is released from column III' and column IV', respectively, in the first frame section 1005B and the devices above descend along the paths defined by those columns causing seismic sensor devices 110 from the second frame 1005B to enter the first frame section 1005A. The deployment of seismic sensor devices 110 may repeat in this manner until the automated basket 125 is depleted of seismic sensor devices 110. This sequence minimizes differential movement of seismic sensor devices 110 in differing columns thus allowing the necessary slack in connecting cables (805 of FIG. 9A, not shown in this figure) to be minimized.

In an alternative example, the seismic sensor devices 110 are released in an X or crisscross pattern. As an example, a single first seismic sensor device 110 is released from column I' in the first frame section 1005B with the devices from column I'' moving to column I' as described above. Next, a single second seismic sensor device 110 is released from column III' with a seismic sensor device 110 from column III'' moving to column III' as described above. Next, a single third seismic sensor device 110 is released from either of columns II' or IV' with a seismic sensor device 110 from the frame section 1005A moving to the chosen column II' or IV'. The seismic sensor device 110 from the unused column II' or IV' may be released as a fourth seismic sensor device 110 with a seismic sensor device 110 from the frame section 1005A moving to the frame section 1005B. The deployment of seismic sensor devices 110 may repeat in this crisscross manner until the automated basket 125 is depleted of seismic sensor devices 110.

In one embodiment, each of the mating ends 1010A, 1010B include at least one coupling mechanism 1020. The coupling mechanism 1020 includes one or a combination of a fastening device to couple the mating ends 1010A, 1010B together and a drive device to facilitate release of the seismic sensor devices 110 from the automated basket 125. The one or more coupling mechanisms 1020 may be disposed on corners and/or centers of the mating ends 1010A, 1010B, on the sides of the frame sections 1005A, 1005B, or combinations thereof.

Figure 10C:
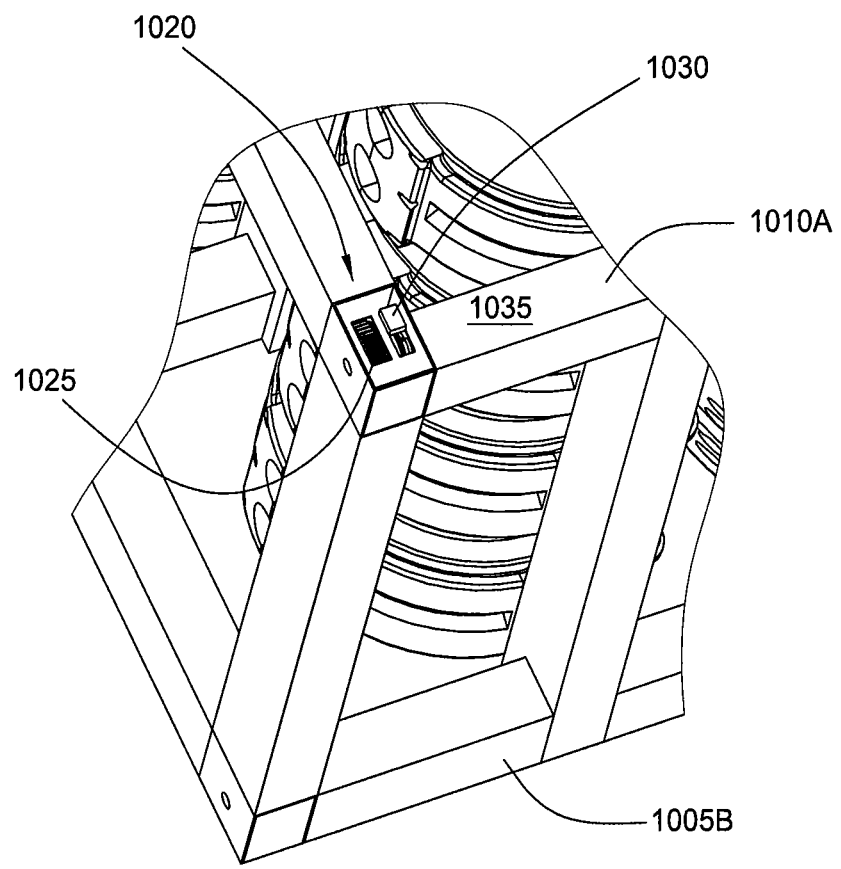
FIG. 10C is an isometric plan view of a mating end of the frame section shown in FIG. 10B.

FIG. 10C is an isometric plan view of the mating end 1010A of the frame section 1005B shown in FIG. 10B. In one embodiment, the coupling mechanism 1020 includes a power transmission device 1025 and a locking device 1030. The locking device 1030 is adapted to interface with a corresponding locking device on the frame section 1005A (not shown). In another embodiment, the coupling mechanism 1020 may not include a locking device 1030. In this embodiment, the locking device 1030 may be replaced by other fasteners, such as bolts, clamping devices, hooks or other devices adapted to couple the frame sections 1005A, 1005B together.

In one embodiment, the power transmission device 1025 is a sprocket or gear that is coupled between the drive mechanism(s) on the frame section 1005B that control the release of seismic sensor devices 110. The power transmission device 1025 is adapted to interface with another power transmission device disposed on the frame section 1005A (not shown). The power transmission device 1025 is adapted to transmit motive force from the basket drive apparatus 600 (FIG. 6) disposed on the frame section 1005A to the drive mechanism(s) on the frame section 1005B. For example, motive force from the basket drive apparatus 600 is transferred through the frame section 1005A to the frame section 1005B to control release of seismic sensor devices 110. In one embodiment, at least a portion of the power transmission device 1025 protrudes beyond an upper surface 1035 of the frame section 1005B to facilitate mating with another power transmission device disposed on the frame section 1005A (not shown).

FIG. 11 is an isometric cross-sectional view of a frame section 1100, which may be utilized as either of the frame sections 1005A, 1005B shown in FIG. 10A. The frame section 1100 includes the power transmission device 1025 which may be a gear that is coupled to a shaft 1105 and at least one sprocket 1110A, 1110B. In one embodiment, when the frame section 1100 is utilized as the frame section 1005A, the power transmission device 1025 is adapted to couple to the basket drive apparatus 600 (FIG. 6) or other drive system adapted to provide motive force to the power transmission device 1025 and sprocket 1110A. In this embodiment, the sprocket 1110A is coupled to a chain or belt that is coupled to a sprocket and power transmission device (both not shown) disposed on an opposing end (not shown) of the frame section 1100. The sprocket and power transmission device on the opposing end of the frame section 1100 couples with the power transmission device 1025 on the frame section 1005B (FIG. 10C) to drive the feed mechanism(s) 270 on the frame section 1005B. In this manner, release of seismic sensor devices 110 is controlled by the feed mechanism 270 on the frame section 1005B based on motive force provided from the basket drive apparatus 600 through the frame section 1005A.

In another embodiment, when the frame section 1100 is utilized as the frame section 1005B, the power transmission device 1025 may be coupled to the sprocket 1110B by the shaft 1105. In this embodiment, the sprocket 1110B is coupled to a chain or belt that is coupled to the feed mechanism(s) 270 on the frame section 1005B. Motive force is provided by the basket drive apparatus 600 through the frame section 1005A (not shown) to control the release of seismic sensor devices 110.

Figure 12:
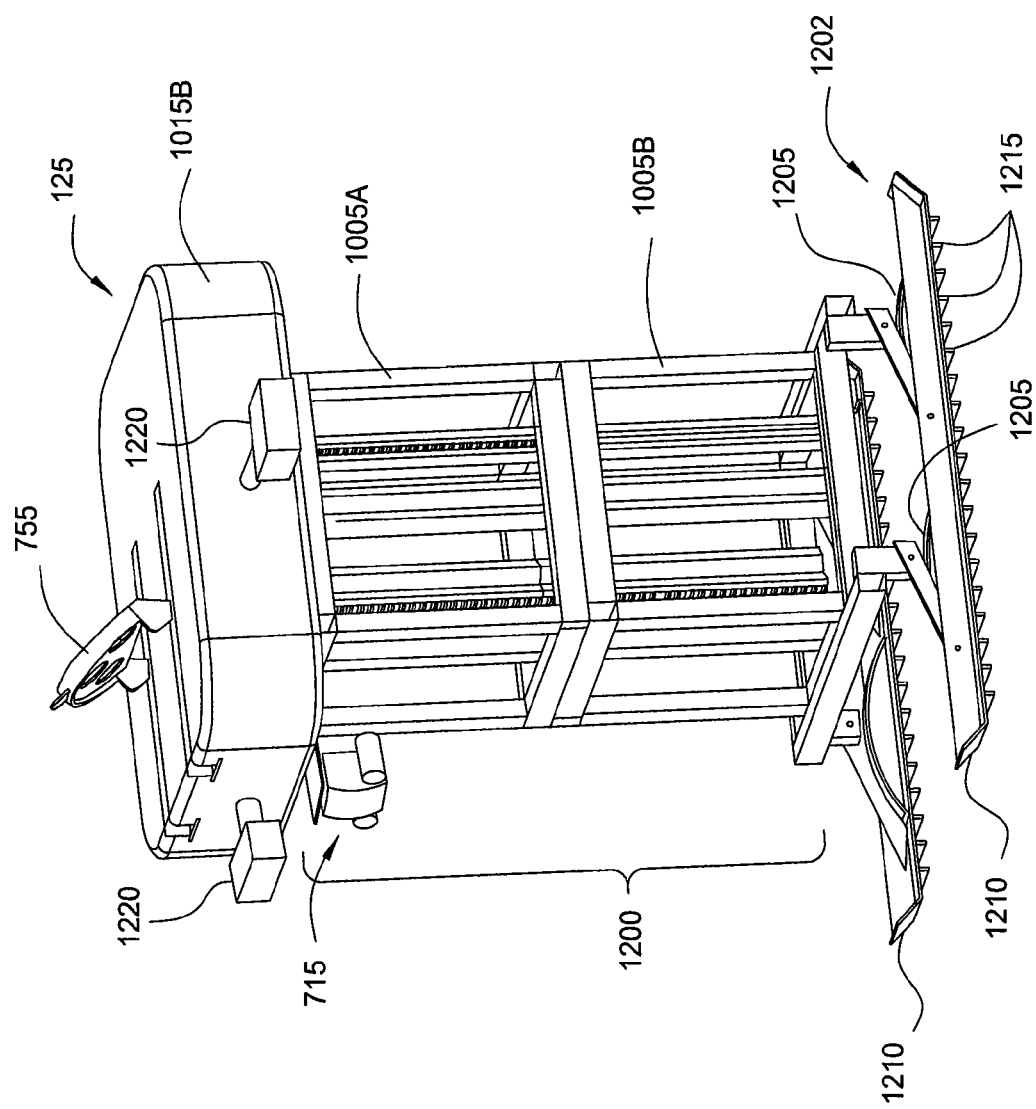
FIG. 12 is an isometric side view of another embodiment of an automated basket.

FIG. 12 is an isometric side view of another embodiment of an automated basket 125. In this embodiment, the automated basket 125 includes a replaceable containment frame 1200 comprising one or more of the frame sections 1005A and 1005B. The containment frame 1200 facilitates containment of a plurality of seismic sensor devices 110 (not shown) and discharge machinery for the seismic sensor devices 110. The containment frame 1200 may be detachably mounted to the cover 1015B that houses drive components as described in FIG. 6 and facilitates driving the discharge machinery of the containment frame 1200. Additionally, the automated basket 125 includes a skid structure 1202 that may be detachably mounted to the containment frame 1200. In one embodiment, one or both of the cover 1015B and skid structure 1202 may be attached to the containment frame 1200 for use in a deployment operation and detached when the containment frame 1200 is not in use to facilitate storage on the deck of a support vessel 140 (FIG. 1). In this manner, the containment frame 1200 may be stored, serviced and/or replenished with additional seismic sensor devices 110 while the cover 1015B and/or the skid structure 1202 may be coupled to other containment frames for use in a deployment operation.

In one embodiment, the skid structure 1202 includes springs 1205 adapted to absorb shock and/or facilitate stabilization of the automated basket 125. In one embodiment, the skid structure 1202 includes one or more support members 1210 adapted to stabilize the automated basket 125 and/or minimize sinking of the automated basket 125 when the seafloor is muddy or silty. In another embodiment, the skid structure 1202 includes one or more cleats or pads 1215 adapted to prevent horizontal motion where the automated basket 125 is landed on the seafloor.

In one embodiment, the cover 1015B includes one or more propulsion devices 1220. The one or more propulsion devices 1220 may be a thruster that is positionable to relative to the cover 1015B and/or the containment frame 1200 to provide directional movement to the automated basket 125 when submerged.

FIGS. 13A and 13B show isometric views of another embodiment of an automated basket 125. In this embodiment, the automated basket 125 includes a frame 130 that is triangular in shape and includes six columns I-VI of seismic sensor devices 110. The automated basket 125 also includes a center area 900 that is open or free from machinery or obstructions providing an internal topological connection path for a cable(s) 805 (FIG. 9A) to occupy. While the embodiment shown includes six columns I-VI and is configured for an internal topological connection, the frame 130 may be configured for as few as three columns and as many as 12, 15, or more columns of seismic sensor devices 110. The automated basket 125 shown may also be configured for an external topological connection for the cable(s) 805 as shown in FIG. 9B.

Figures 14A, 14B:
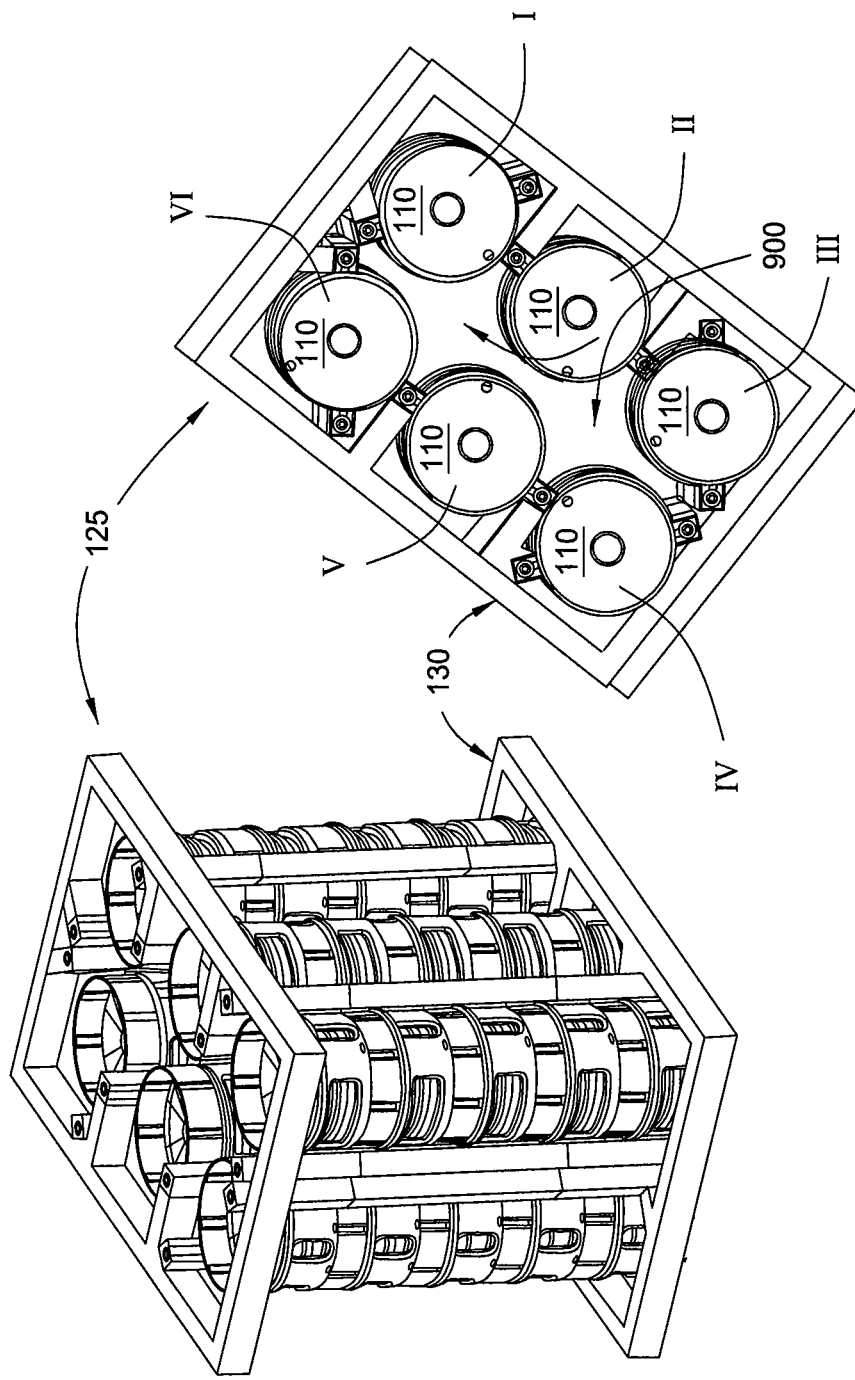
FIGS. 14A and 14B are isometric views of another embodiment of an automated basket.

FIGS. 14A and 14B show isometric views of another embodiment of an automated basket 125. In this embodiment, the automated basket 125 includes a frame 130 that is rectangular in shape and includes six columns I-VI of seismic sensor devices 110. The automated basket 125 also includes a center area 900 that is open or free from machinery or obstructions enabling an internal topological connection for a cable(s) 805 (FIG. 9A). While the embodiment shown includes six columns I-VI and is configured for an internal topological connection, the frame 130 may be configured for as few as one column and as many as 8, 10, or more columns of seismic sensor devices 110. The automated basket 125 shown may also be configured for an external topological connection for the cable(s) 805 as shown in FIG. 9B.

Embodiments of the automated basket 125 described herein obviate the need for one or more ROV's utilized in a seismic sensor device deployment operation. In other embodiments, the need for additional dynamic positioning (DP) surface ships utilized in a seismic sensor device deployment operation is minimized. In other embodiments, the tethering of the deployed seismic sensor devices allows retrieval of seismic sensor devices without the utilization of ROV's in the retrieval process. The elimination of ROV's and/or minimization of DP surface vessels significantly lowers the cost of a seismic survey. For example, the ROV(s), the ROV tether management system, tender, manipulation arm(s), and highly skilled operators are not necessary, which drastically reduces the operational cost and changes the economics of this type of ocean exploration. Further, embodiments of the automated basket 125 as described herein include minimal mechanical and/or electrical components, which minimizes the possibility of mechanical failures and/or downtime for maintenance. Thus, embodiments of the automated basket 125 save time and money by decreasing downtime and streamlining the seismic deployment operation.

While the foregoing is directed to embodiments of the invention, other and further embodiments of the invention may be devised without departing from the basic scope thereof.

What is claimed is:

1. An apparatus for transferring seismic sensor devices to a subsea location, the apparatus comprising:
 a frame structure having one or more rails disposed thereon, the one or more rails comprising an elevator mechanism for containing a plurality of serially connected seismic sensor devices and defining at least one exit path for dispensing one or more of the plurality of seismic sensor devices from the elevator mechanism to the subsea location;
 a cover disposed on a first end of the frame structure, wherein a drive mechanism is disposed at least partially in the cover, and wherein the drive mechanism comprises a linear drive for moving a cable attachment device relative to the frame.

2. An apparatus for transferring seismic sensor devices to a subsea location, the apparatus, comprising:
 a frame structure having one or more pairs of linear rails, the frame structure supporting a plurality of seismic sensor devices and defining at least one exit path for a first seismic sensor device of the plurality of seismic sensor devices and a portion of a cable that is coupled between the first seismic sensor device and a second seismic sensor device;
 a drive mechanism disposed in at least one of the linear rails;
 a motor coupled to the drive mechanism; and
 a cover disposed on the frame structure, wherein the cover comprises a linear drive for moving a cable attachment device relative to the frame.

* * * * *